US011350427B2

(12) United States Patent
Sevindik et al.

(10) Patent No.: US 11,350,427 B2
(45) Date of Patent: *May 31, 2022

(54) METHODS AND APPARATUS FOR RESERVING AND/OR UTILIZING RESOURCES IN A WIRELESS NETWORK

(71) Applicant: Charter Communications Operating, LLC, St. Louis, MO (US)

(72) Inventors: Volkan Sevindik, Parker, CO (US); Perwaiz Akhtar, Aurora, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,490

(22) Filed: Sep. 11, 2020

(65) Prior Publication Data

US 2021/0029717 A1 Jan. 28, 2021

Related U.S. Application Data

(63) Continuation of application No. 16/518,017, filed on Jul. 22, 2019.

(51) Int. Cl.
*H04W 16/14* (2009.01)
*H04W 72/08* (2009.01)
(Continued)

(52) U.S. Cl.
CPC ..... *H04W 72/085* (2013.01); *H04W 28/0236* (2013.01); *H04W 28/26* (2013.01); *H04W 48/20* (2013.01)

(58) Field of Classification Search
CPC .......... H04W 72/085; H04W 28/0236; H04W 28/26; H04W 48/20; H04W 16/14; H04W 24/08; H04W 88/12; H04W 16/20; H04W 24/02; H04W 84/045; H04W 84/12; H04W 84/18; H04W 88/06; H04W 16/02; H04W 16/18; H04W 28/18; H04W 4/50
(Continued)

(56) References Cited

U.S. PATENT DOCUMENTS 10,813,103 B1 * 10/2020 Sevindik ............... H04W 48/20
2020/0008007 A1 * 1/2020 Belghoul ............... H04W 24/08

* cited by examiner

*Primary Examiner* — Philip Sobutka
(74) *Attorney, Agent, or Firm* — Straub & Straub; Stephen T. Straub; Michael P. Straub

(57) ABSTRACT

Methods and apparatus for managing spectrum in a CBRS network to provide services to user equipment devices located at a customer's premises. In various embodiments, the customer premises has no landline connection. An exemplary method embodiment includes the steps of: receiving, by the CBRS CPE base station, over the air from each of a plurality of Citizens Broadband Radio Service Fixed Wireless Access (CBRS FWA) tower base stations a reference signal; selecting, based on the strength of each of the received reference signals, a primary CBRS FWA tower base station from the plurality of CBRS FWA tower base stations; establishing, by the CBRS CPE base station, a wireless communications link connection with the CBRS FWA tower base station selected as the primary CBRS FWA tower base station; reserving, by the CBRS CPE base station, an amount of spectrum for communicating with one or more auxiliary CBRS FWA tower base stations.

20 Claims, 20 Drawing Sheets

(51) Int. Cl.
*H04W 28/02* (2009.01)
*H04W 48/20* (2009.01)
*H04W 28/26* (2009.01)

(58) Field of Classification Search
USPC ............. 455/426.2, 447, 424, 425, 524, 517
See application file for complete search history.

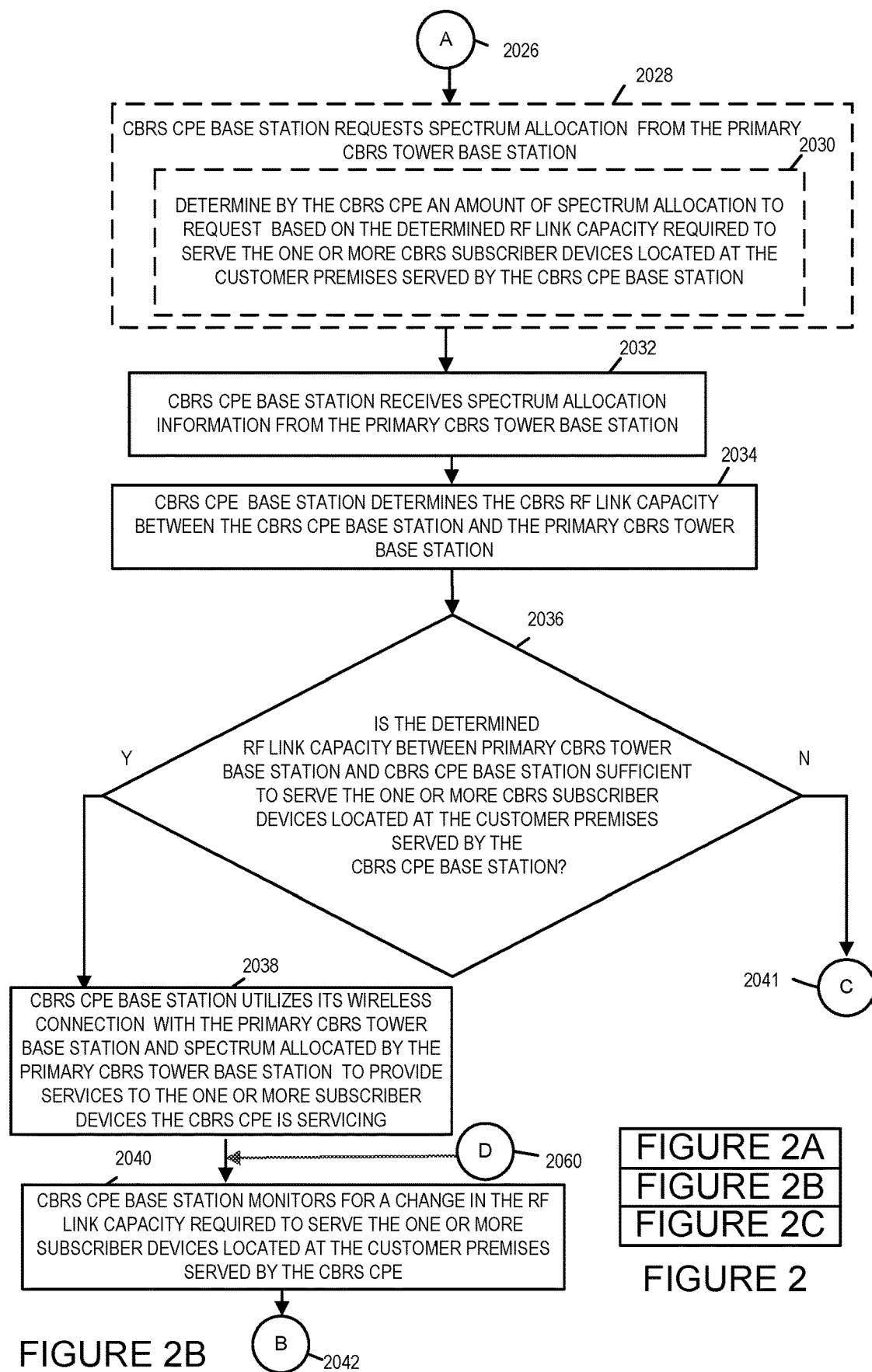

| | CBRS TOWER ID ← 1102 | RANK ← 1104 | RSRP ← 1106 |
|---|---|---|---|
| 1118 → | CBRS TOWER ID | RANK | RSRP |
| 1120 → | CBRS TOWER 1 | 1 (STRONGEST) | -95 dBm |
| 1122 → | CBRS TOWER 2 | 2 | -115 dBm |
| 1124 → | CBRS TOWER 3 | 3 | -117 dBm |
| 1126 → | CBRS TOWER 4 | 4 (WEAKEST) | -120 dBm |

| CBRS TOWER ID | RANK | RSRP | DESIGNATION | CPE CONNECTION STATUS |
|---|---|---|---|---|
| CBRS TOWER 1 | 1 (STRONGEST) | -95 dBm | PRIMARY | MAIN |
| CBRS TOWER 2 | 2 | -115 dBm | AUXILIARY | |
| CBRS TOWER 3 | 3 | -117 dBm | AUXILIARY | |
| CBRS TOWER 4 | 4 (WEAKEST) | -120 dBm | AUXILIARY | |

FIGURE 12

| CBRS TOWER ID | RANK | RSRP | DESIGNATION | CPE CONNECTION STATUS/SPECTRUM |
|---|---|---|---|---|
| CBRS TOWER 1 | 1 (STRONGEST) | -95 dBm | PRIMARY | MAIN/20 MHz |
| CBRS TOWER 2 | 2 | -115 dBm | AUXILIARY | TEMPORARY/20 MHz |
| CBRS TOWER 3 | 3 | -117 dBm | AUXILIARY | TEMPORARY/10MHz |
| CBRS TOWER 4 | 4 (WEAKEST) | -120 dBm | AUXILIARY | NO CONNECTION |

FIGURE 13

| CBRS TOWER ID | RANK | RSRP | DESIGNATION | SPECTRUM AVAILABLE | CPE CONNECTION STATUS/SPECTRUM |
|---|---|---|---|---|---|
| CBRS TOWER 1 | 1 (STRONGEST) | -95 dBm | PRIMARY | 20 MHz | MAIN/20 MHz |
| CBRS TOWER 2 | 2 | -115 dBm | AUXILIARY | 10 MHz | TEMPORARY/10MHz |
| CBRS TOWER 3 | 3 | -117 dBm | AUXILIARY | 10MHz | NO CONNECTION |
| CBRS TOWER 4 | 4 (WEAKEST) | -120 dBm | AUXILIARY | 20MHz | TEMPORORAY/20MHz |

FIGURE 14

METHODS AND APPARATUS FOR RESERVING AND/OR UTILIZING RESOURCES IN A WIRELESS NETWORK

RELATED APPLICATIONS

The present application is a continuation of U.S. patent application Ser. No. 16/518,017 filed on Jul. 22, 2019 which is hereby expressly incorporated by reference in its entirety.

FIELD OF INVENTION

The present invention relates to methods and apparatus for managing resources in a Citizen Broadband Radio Service (CBRS) network. More particularly, the present invention relates to methods and apparatus for CBRS customer premise equipment (CPE) base stations to reserve and utilize resources, e.g., spectrum, from a plurality of different CBRS fixed wireless access tower base stations to provide services, e.g., broadband services, to subscribers or users located within a customer's premises served by the CBRS CPE base station and/or within the CBRS CPE base station's coverage area. The present invention further relates to methods and apparatus for providing services to customer premises equipment devices without the need for a landline connection to the customer premise in which the customer premise equipment devices are located.

BACKGROUND OF THE INVENTION

In a Citizens Broadband Radio Service (CBRS) network, Citizen Citizens Broadband Radio Service Devices serve as access points which can support wireless communications with user equipment devices (UEs).

A CBRS network includes a plurality of CBSD devices. The CBSD devices provide wireless services to subscribers' user equipment devices, Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

Many customer premises, e.g., homes do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. While CBSD devices can provide services to customer premise user equipment devices, e.g., user equipment devices, located in a home at a customer's premises, there is a lack of fixed wireless access base station resources, e.g., spectrum or bandwith, to adequately support all the devices operating at a particular customer premises. When each customer premise user equipment device only receives resources from a single CBSD which typically is covering a large number of customer premises, e.g., 100 customer premises, there is insufficient resources, spectrum for providing services to each of the devices at that the 100 different customer premises. While the CBSD which is servicing the various devices at a customer premises may not have the available resources, e.g., spectrum, other CBSDs base stations may have available resources which are not being used.

From the above it should be understood that there is a need for new and/or improved methods and apparatus to reserve and utilize resources, e.g., spectrum, from a plurality of different base stations, e.g., CBSD devices, to provide services, e.g., broadband services, to subscribers or users located within a customer premises equipment base station's coverage area. There is a further need for new and/or improved methods and apparatus for providing services to devices located at customer premises without a landline connection or a landline connection capable of providing broadband services and/or where a landline is not practicable or economical. Additionally, there is a need for new and/or improved methods and apparatus for managing, e.g., reserving, allocating, and using, resources from a plurality of different fixed wireless base stations to provide services to a plurality of customer premise equipment devices located at a customer's premises. There is a further need for new and/or improved methods and apparatus for combining spectrum allocation needs for a plurality of user devices located at a customer premises or in a home served by a wireless communications link. There is also a need for new and/or improved methods and apparatus to solve the technological problem of how to overcome congestion problems when a single base station does not have the capacity to provide the requested services for a plurality of devices within its coverage area. Moreover, there is a need for new and/or improved methods of providing additional resources, e.g., bandwidth, to customer premises devices in addition to the landline and current wireless methods available.

SUMMARY OF THE INVENTION

The present invention includes novel methods and apparatus for managing resources, e.g., spectrum or bandwidth, in a Citizen Broadband Radio Service (CBRS) network. The use of spectrum refers to frequency spectrum or bandwidth. The present invention includes a novel CBRS customer premise equipment (CPE) base station and novel method of operating the CBRS customer premise equipment base station to reserve and utilize resources, e.g., spectrum, from a plurality of different CBRS fixed wireless access tower base stations to provide services, e.g., broadband services, to subscribers or users located within a customer's premises served by the CBRS CPE base station and/or within the CBRS CPE base station's coverage area. The present invention also provides techniques for providing services to customer premises equipment devices without the need for a landline connection to the customer premise in which the customer premise equipment devices are located. The present invention also includes new methods and apparatus for providing additional resources or capacity, e.g., bandwidth, to customer premises that include landline or other wireless connections. The invention being particularly useful when the landline connection and/or other wireless connections provide insufficient bandwidth or spectrum for the services being requested by the devices at the customer premises. Various embodiments of the present invention solve one or more of the problems discussed above.

Various embodiments of the present invention utilize CBRS Fixed Wireless Access base stations and CBRS Customer Premise Equipment (CPE) base stations to provide services, e.g., broadband services, devices located at a customer's premises that does not have a landline connection or in some embodiments the landline connection is insufficient to service the various devices located at the customer's premises. The CBRS CPE base stations being located at a customer premise in the coverage area of multiple CBRS fixed wireless access tower base stations. The CBRS CPE base station selecting a main or primary CBRS fixed wireless access base station from a plurality of CBRS FWA tower base stations from which it receives a reference signal. The selection being based on the strength of the reference signals received from each of the plurality of CBRS FWA tower base stations. The CBRS CPE base station registering and/or establishing and maintaining a wireless link connection with the selected CBRS FWA tower base station. When the CBRS CPE base station determines the primary CBRS FWA tower base station has insufficient resources, e.g., spectrum, allocated to the CBRS CPE base station needed to support the services being provided the user equipment devices by the CBRS CPE base station, CBRS CPE base station temporarily reserves and utilizes resources, e.g., spectrum, from other CBRS FWA tower base stations which are referred to as auxiliary CBRS FWA tower base stations therein overcoming the congestion problem.

By using one or more of the techniques described herein a Citizens Broadband Radio Service Customer Premise Equipment base station can provide services, e.g., broadband services, to devices located at a customer's premises that does not include a landline for providing broadband services such as internet access, media download, video on demand services, voice over internet protocol services, etc.

An exemplary method embodiment of operating a Citizens Broadband Radio Service Customer Premise Equipment (CBRS CPE) base station in a CBRS network includes the steps of: receiving, by the CBRS CPE base station, over the air from each of a plurality of Citizens Broadband Radio Service Fixed Wireless Access (CBRS FWA) tower base stations a reference signal; selecting, based on the strength of each of the received reference signals, a primary CBRS FWA tower base station from the plurality of CBRS FWA tower base stations; establishing, by the CBRS CPE base station, a wireless communications link connection with the CBRS FWA tower base station selected as the primary CBRS FWA tower base station; and reserving, by the CBRS CPE base station, an amount of spectrum for communicating with one or more auxiliary CBRS FWA tower base stations.

In some embodiments, the CBRS CPE base station is located at a customer premises which does not include a wired or optical broadband service connection. In some embodiments, user equipment devices located at the customer premises at which the CBRS CPE base station is located are only provided broadband services through wireless communications, said wireless communications including CBRS network wireless communications. In some embodiments, the CBRS CPE base station is located at a customer premises which has no landline connection.

In most embodiments, one or more of the plurality of CBRS FWA tower base stations are simultaneously operated as or simultaneously serve as primary CBRS CPE base stations and auxiliary CBRS CPE base stations with regard to different additional CBRS CPE base stations located within their coverage area. The plurality of CBRS FWA tower base stations also have overlapping coverage areas.

In some embodiments, the step of selecting, based on the strength of each of the received reference signals a primary CBRS FWA tower base station from the plurality of CBRS FWA tower base stations includes: (i) determining, by the CBRS CPE base station, a Reference Signal Received Power (RSRP) level value for each reference signal received from the plurality of CBRS FWA tower base stations; and (ii) selecting, by the CBRS CPE base station, the CBRS FWA base station having the strongest RSRP level value as the primary CBRS FWA tower base station.

In some embodiments, the CBRS CPE base station designates one or more of the CBRS FWA base stations which were not selected as the primary CBRS FWA tower base station as auxiliary CBRS FWA tower base stations.

The CBRS CPE base station provides broadband services to one or more devices, e.g., user equipment devices or subscriber devices, located at a customer premises.

The CBRS CPE base station in some embodiments includes at least a first portion and a second portion, the first portion of the CBRS CPE base station is located within a building at the customer premises and the second portion of the CPE CBRS base station which includes an antenna or antenna array is mounted at an elevated position at the customers premises. The antenna or antenna array being used to wirelessly communicate with said primary CBRS FWA base station and one or more auxiliary CBRS FWA base stations.

The antenna or antenna array is sometimes mounted on the roof of the building at the customer premises or on a pole outside the building at the customer premises.

The CBRS CPE base station typically includes a plurality of communications interfaces such as for example a first wireless communications interface for communicating with CBRS FWA base stations and a second wireless communications interface for communicating with user equipment devices. The user equipment devices in some embodiments are CBRS user equipment devices such as for example CBRS phones.

Prior to the step of reserving, by the CBRS CPE base station, spectrum for communicating with one or more auxiliary CBRS FWA tower base stations, in some embodiments the CBRS CPE base station determines whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises; and when the amount of spectrum allocated by the primary CBRS FWA base station to the CBRS CPE base station for device to device communications between the CBRS CPE base station and the CBRS FWA base station is not sufficient for providing the broadband services to the one or more user equipment devices located at the customer premises, the CBRS CPE base station determines an amount of additional spectrum required for providing the broadband services to the one or more user equipment devices located at the customer premises. The amount of spectrum reserved, by the CBRS CPE base station, for communicating with one or more auxiliary CBRS FWA tower base stations is an amount which equals or exceeds the amount of additional spectrum required for providing the broadband services to the one or more user equipment devices located at the customer premises.

In some embodiments, the step of determining, by the CBRS CPE base station, whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises includes the CBRS CPE base station measuring a load that is caused by serving the user equipment devices located at the customers premises and/or within the CBRS CPE base stations coverage area.

In some embodiments, the method further includes the following steps: establishing, by the CBRS CPE base station, temporary wireless communications link connections with the one or more auxiliary CBRS FWA tower base stations; utilizing said reserved spectrum for providing said broadband services to the one or more user equipment devices located at the customer premises and determining, by the CBRS CPE base stations, when said reserved spectrum is no longer needed to support the broadband services being provided by the CBRS CPE base station to the user equipment devices located at the customer premises releasing, by the CBRS CPE base station, reserved spectrum determined to no longer be needed, and terminating, by the CBRS CPE base station, the temporary wireless communications link connections with the one or more auxiliary CBRS FWA tower base stations when said reserved spectrum is released.

In some embodiment the step of reserving, by the CBRS CPE base station, an amount of spectrum for communicating with one or more auxiliary CBRS FWA tower base stations includes: requesting from one or more of the one or more auxiliary CBRS FWA tower base stations what spectrum each CBRS FWA tower has available.

In some embodiments, the method further includes determining which of the one or more auxiliary CBRS FWA tower base station to reserve available spectrum from based on: (i) the amount of additional spectrum to be reserved, (ii) an amount of spectrum reported as being available at the auxiliary CBRS FWA tower base station, and (iii) the strength of the reference signal received from the auxiliary CBRS FWA tower base station.

Various method embodiments include the steps of: (i) monitoring, by the CBRS CPE base station, for a change in a radio frequency link capacity required to serve the one or more user equipment devices located at the customer premises and upon detecting a change in the radio frequency link capacity required to serve the one or more user equipment devices located at the customer premises determining if an amount of additional spectrum in excess of the amount of spectrum allocated by the primary CBRS tower base station is required. When an amount of additional spectrum in excess of the amount of spectrum allocated by the primary CBRS tower base station is determined to be required, (i) the CBRS CPE base station requests one or more of the auxiliary CBRS FWA tower base stations provide information indicating an amount of spectrum the corresponding auxiliary CBRS FWA tower base station has available and then reserves available spectrum from one or more of the one or more auxiliary CBRS FWA tower base stations based on the amount of additional spectrum required, the amount of spectrum available, and the strength of the RSRP level value of the reference signal received from the one or more auxiliary CBRS FWA tower base stations.

In some other embodiments, the method further includes the steps of: prior to reserving, by the CBRS CPE base station, an amount of spectrum for communicating with the one or more auxiliary CBRS FWA tower base stations, ranking, by the CBRS CPE base station, the plurality of CBRS FWA base stations from strongest RSRP level value to weakest RSRP level value; requesting, by the CBRS CPE base station, spectrum availability from the one or more auxiliary CBRS FWA base stations; and selecting said one or more CBRS FWA base stations from which to reserve an amount of spectrum based on: (i) amount of spectrum to be reserved, (ii) auxiliary CBRS FWA base station's spectrum availability and RSRP ranking.

The present invention is applicable to apparatus and system embodiments wherein one or more devices implement the steps of the method embodiments. In some apparatus embodiments each of the CBRS tower base stations, CBRS CPE base stations, user equipment devices, SAS devices and each of the other apparatus/devices of the system include one or more processors and/or hardware circuitry, input/output interfaces including receivers and transmitters, and a memory. The memory including instructions when executed by one or more of the processors control the apparatus/device of the system to operate to perform the steps of various method embodiments of the invention.

The present invention is also applicable to and includes apparatus and systems such as for example, apparatus and systems that implement the steps of the method embodiments. For example, a CBRS CPE base station in accordance with one embodiment of the present invention includes: memory; a first wireless input/output interface that communicates with a plurality of Citizens Broadband Radio Service Fixed Wireless Access (CBRS FWA) tower base stations; a second wireless input/output interface that communicates with user equipment devices; a processor that control the CBRS CPE base station to: receive, by the first wireless input/output interface, over the air from each of a plurality of Citizens Broadband Radio Service Fixed Wireless Access (CBRS FWA) tower base stations a reference signal; select, based on the strength of each of the received reference signals, a primary CBRS FWA tower base station from the plurality of CBRS FWA tower base stations; establish, by the CBRS CPE base station, a wireless communications link connection with the CBRS FWA tower base station selected as the primary CBRS FWA tower base station; and reserve, by the CBRS CPE base station, an amount of spectrum for communicating with one or more auxiliary CBRS FWA tower base stations.

In some embodiments, the processor further controls the CBRS CPE base station to: monitor for a change in a radio frequency link capacity required to serve the one or more user equipment devices located at the customer premises; and upon detecting a change in the radio frequency link capacity required to serve the one or more user equipment devices located at the customer premises, determine if an amount of additional spectrum in excess of the amount of spectrum allocated by the primary CBRS tower base station is required; and when an amount of additional spectrum in excess of the amount of spectrum allocated by the primary CBRS tower base station is determined to be required: (i) requesting, by the CBRS CPE base station, one or more of the auxiliary CBRS FWA tower base stations provide information indicating an amount of spectrum the corresponding auxiliary CBRS FWA tower base station has available; (ii) reserving available spectrum from one or more of the one or more auxiliary CBRS FWA tower base stations based on the amount of additional spectrum required, the amount of spectrum available, and the strength of the RSRP level value of the reference signal received from the one or more auxiliary CBRS FWA tower base stations.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B and 2C.

FIG. 2B illustrates the steps of the second part of an exemplary method in accordance with one embodiment of the present invention.

FIG. 11 illustrates an exemplary table of a CBRS tower base stations ranked from strongest to weakest reference signal received power (RSRP) level.

FIG. 12 illustrates an exemplary table of a CBRS tower base stations ranked from strongest to weakest reference signal received power (RSRP) level as well as the designations and connection status of the CBRS tower base stations.

FIG. 13 illustrates an exemplary table of a CBRS tower base stations ranked from strongest to weakest reference signal received power (RSRP) level as well as the designation and connection status of the CBRS tower base stations.

FIG. 14 illustrates an exemplary table of a CBRS tower base stations ranked from strongest to weakest reference signal received power (RSRP) level as well as the designation, available spectrum, and connection status of the CBRS tower base stations.

DETAILED DESCRIPTION

Figure 1:
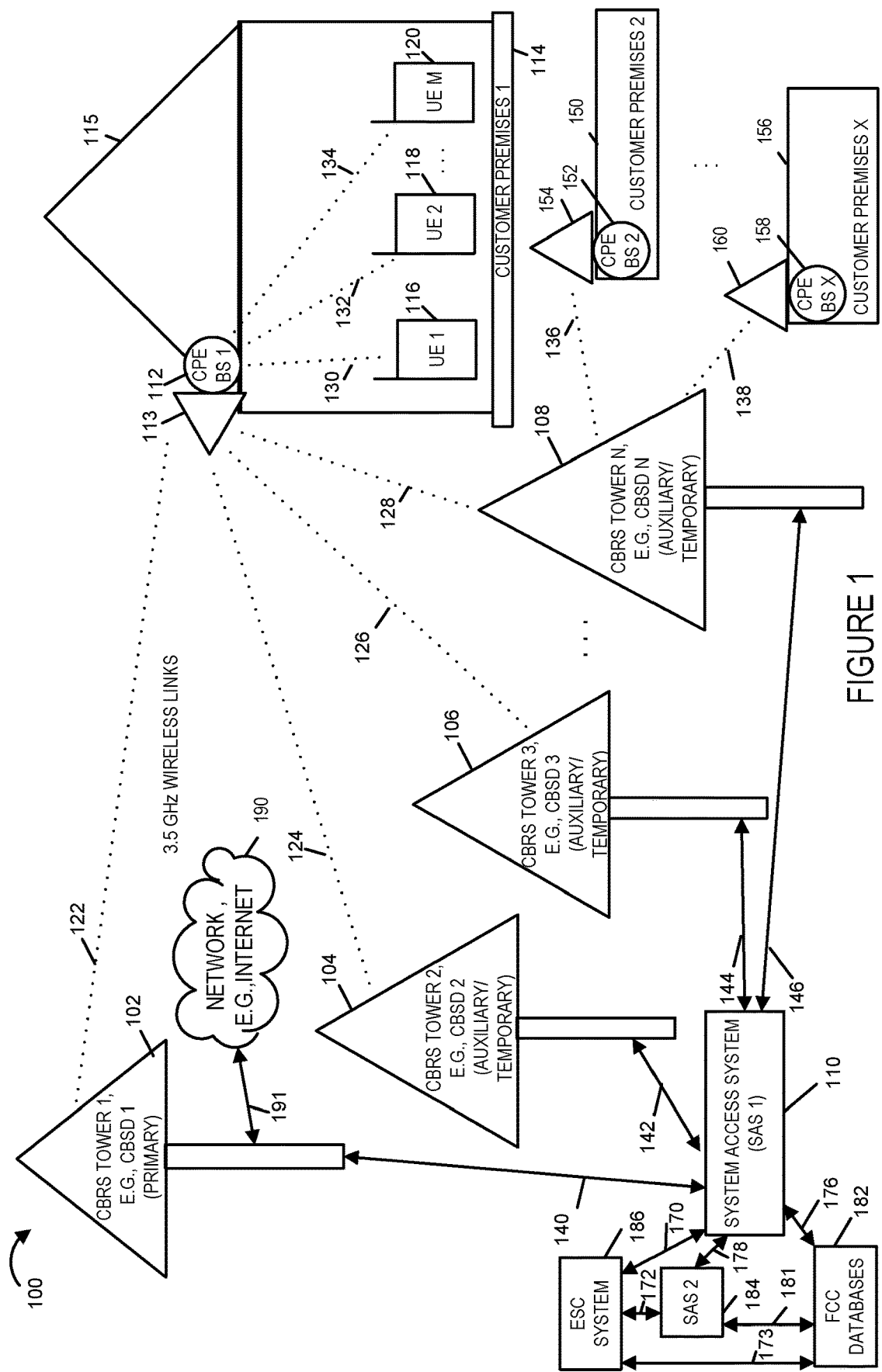
FIG. 1 illustrates an exemplary Citizens Broadband Radio Service network system 100 that provides wireless communications services in accordance with one embodiment of the present invention.

The current invention is applicable to Citizens Broadband Radio Service (CBRS) networks that provide wireless communications services, e.g., broadband services. The present invention solves the network resource congestion problem in customer premises equipment devices (CPEs) used in citizens broadband radio service fixed wireless access networks. The main issues or technological problems with known CPE devices is the lack of fixed wireless access base station resources. The present invention relates to methods, systems and apparatus for providing services to subscriber user devices at a customer's premises, e.g., house, business, or other location, via a CBRS customer premise equipment base station that reserves spectrum bandwidth resources for communicating with one or more CBRS fixed wireless access tower base stations in the CBRS network to provide broadband services to the user devices within its coverage area. Various embodiments of the present invention are directed to new apparatus and methods for providing wireless services to a new type of CBRS base station, a customer premise equipment base station, located at a customer's premises and providing services to users located at the customer's premises.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for managing the allocation and use of resources, e.g., spectrum, from a plurality of CBSDs, i.e., CBRS Fixed Wireless Access Tower base stations at the same time to provide services, e.g., broadband services, to a plurality of devices located at a customer's premises such as a home via a Citizens Broadband Radio Service Customer Premise Equipment base station.

In the present invention, Citizen Broadband Radio Service spectrum, 3.5 GHz frequency spectrum band, is used to serve nomadic and stationary users. This use case is referred to as fixed wireless access, and a new fixed wireless access base station is used to serve special equipment referred to as CBRS Customer Premise Equipment (CPE) base stations. The invention is particularly useful to provide broadband services to geographically isolated or remote areas, e.g., rural areas, where wired or optical connections are expensive and not economical given the number of customers to be serviced.

The CBRS CPE base stations are located at a customer's premises inside of a house, business or any place where there are CBRS network users. The CBRS CPE base station is coupled or connected to a plurality of CBRS fixed wireless access (FWA) tower base stations over wireless communications links. The CBRS CPE base station is typically located in a building such as a home and is coupled to one or more antennas or an antenna array through which the CBRS CPE base station transmits to and receives from the antenna(s) of the CBRS FWA tower base stations wireless signals over the wireless communications links. These wireless communications links also being in the 3.5 GHz frequency spectrum band. The CBRS CPE base stations serve subscribers or users located in their coverage area, e.g., in the house, building, or on the customer's premises.

The CBRS FWA tower base stations are CBSD devices and as such have their transmission power levels and spectrum bandwidth allocated or assigned to them via a Spectrum Access System of the CBRS network.

Each CBRS FWA tower base station is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations. In some embodiments, CBRS CPE base stations are also coupled to and registered with the CBRS Spectrum Access System either directly or via a CBRS FWA tower base station. The SAS in such systems takes into account the different types of devices being supported by the CBRS FWA tower base station when assigning spectrum for use. The CPE CBRS antenna(s) are typically located at an elevated position such as for example on the top of a roof of a building or on a pole outside the building in which the CBRS CPE base station is located.

The transmission power levels allocated for the CBRS FWA tower base stations are high in comparison to the transmission power level of the CBRS CPE base stations. For example, a CBRS FWA tower base station coverage area can include hundreds of customer premises while the CBRS CPE base station has a much smaller coverage area. Each CBRS CPE base station located at a customer's premises provides services to subscriber's user equipment devices such as computers, laptops tablets, smart devices (e.g., appliances, watches, smartTVs), streaming devices, WiFi devices, CBRS enabled devices (e.g., CBRS phones), within the CBRS CPE coverage range at the customer's premises. In some embodiments, the CBRS CPE base station includes wireless interfaces so that it can communicate with not only CBRS wireless user equipment devices but also with WiFi devices. In some embodiments, the CBRS CPE base station has wired and/or optical interfaces so that it can be coupled to and communicate with WiFi base stations or devices with wired and/or optical interfaces such as internet telephony systems, cable network devices, internet media streaming devices, e.g., over wired or optical networks (e.g., local area networks or wide area networks) at the customer's premises. The CBRS CPE base stations in some embodiments are enhanced CBRS phones which are coupled to roof mounted antennas and include a SIM card and additional circuitry and programming instructions or code for providing base station capabilities to user equipment devices and for communicating with the CBRS FWA tower base station.

Various features of an exemplary method embodiment of the present invention will now be discussed. The method starts in a first step with the CBRS tower base station being assigned spectrum from an SAS.

In the second step, a CPE base station at a customer premises becomes active and receives a reference signal from a plurality of CBRS tower base stations. The CBRS CPE base station supports all 3.5 GHz spectrum bands assigned by the SAS, and/or defined by CBRS standardization bodies. The CBRS CPE base station connects with the CBRS tower base station from which it is receiving the strongest reference signal. This is the CBRS CPE base stations primary CBRS tower base station with which it continuously maintains a wireless communications link connection.

In the third step, the CBRS CPE base station creates or generates a table or record that contains all CBRS tower base stations from which the CBRS CPE tower base station is receiving a reference signal along with CBRS tower base station identity and Reference Signal Received Power (RSRP) signal measurements. The CBRS CPE base station ranks all of the CBRS tower base stations with the strongest RSRP power level being ranked first. While the CBRS tower base station has been selected to be the primary CBRS tower base station for the CBRS CPE base station, the remaining CBRS tower base stations who have resources to serve the CBRS CPE base station are designated as auxiliary CBRS tower base stations for the CBRS CPE base station. The CBRS CPE base station will make temporary wireless communications connections with one or more auxiliary CBRS tower bases when the CBRS CPE base station requires resources which are not available from the primary CBRS tower base station.

In the fourth step, the CBRS CPE base station measures its own load which is caused by serving the CBRS subscribers inside the house or on the customer premises at which the CBRS CPE base station is located, for example.

After measuring its load, in the fifth step, the CBRS CPE base station measures the CBRS Radio Frequency (RF) link capacity between the CBRS CPE base station and the primary CBRS tower base station and then determines if the measured capacity is enough to serve all subscribes in its coverage area. If the determination is that there is sufficient CBRS RF link capacity to serve all subscribers in its coverage area, then the CBRS CPE base station maintains its current operational state, i.e., a wireless link connection to the primary CBRS tower base station. If however, the determination is that there is not a sufficient CBRS RF link capacity to serve all subscribers in its coverage area, the CBRS CPE base station will check its table to find the second strongest CBRS tower base station based on RSRP power level and ask that CBRS tower base station (which is an auxiliary CBRS tower base station) if it has any available capacity in terms of MHz. In response, the CBRS tower base station can answer back to the CBRS CPE base station whether it has 1.4 MHz, 3 MHz, 5 MHz, 10 MHz, 15 MHz, or 20 MHz of available spectrum. CBRS CPE base station will then either accept or reject the CBRS tower base station offer of spectrum depending on the amount of available spectrum offered by the CBRS tower base station.

In the sixth step, if the CBRS CPE base station needs less than the spectrum reported by the second strongest CBRS tower base station, the CBRS CPE base station adds this CBRS tower base station's band as a second carrier establishing a temporary connection to the second strongest CBRS tower base station in addition to the connection established and being maintained by the CBRS CPE base station with the primary CBRS tower base station. If the CBRS CPE base station determines that it needs more than the amount of spectrum reported as being available by the second strongest CBRS tower base station, the CBRS CPE base station determines which of the auxiliary CBRS tower base stations or combination of auxiliary CBRS tower base stations from which it is receiving a reference signal have the additional spectrum available and adds their carrier bands. In selecting the auxiliary CBRS tower base station or combination of auxiliary CBRS tower base stations, the CBRS CPE base station can use a variety of different selection criteria. One such selection criteria is for the CBRS CPE base station to establish as few connections as possible as a first criteria and then prioritizing the connections based on the signal strength of the CBRS tower base stations.

Exemplary procedures for deciding which auxiliary CBRS tower base stations to utilize will now be discussed. In a first example, the CBRS CPE base station would add the second strongest CBRS tower base station, calculate the additional amount of spectrum still needed, and ask the other strong CBRS tower base stations to repost their available spectrum, adding additional CBRS tower base stations until a sufficient amount of spectrum has been added. In a second example, the CBRS CPE base station would not add the second strongest CBRS tower base station but would find the next strongest CBRS tower base station, ask it for its available spectrum, and continue the process till a CBRS tower base station is found having the full amount of spectrum needed and then add that CBRS tower base station. If no auxiliary CBRS tower base station has available the full amount of spectrum needed, then the CBRS CPE tower base station chooses the CBRS tower base stations so that first the minimum number of CBRS tower base stations will have to been added and then the strongest CBRS tower base stations when multiple combinations provide the minimum number of CBRS tower base stations needed to be added.

In the seventh and final step, once all the data the subscribers are asking for is delivered, the CBRS CPE base station disconnects from the auxiliary CBRS tower base stations but remains connected to the primary CBRS tower base station.

FIG. 1 illustrates an exemplary CBRS network communications system 100 having an architecture implemented in accordance with the present invention and being coupled to a network 190 (e.g., the internet). The CBRS communications network system 100 includes a plurality of Citizens Broadcast Radio Service FWA tower base stations (CBRS tower base stations) (CBRS tower base station 1 102, CBRS tower base station 2 104, CBRS tower base station 3 106, . . . , CBRS tower base station N 108 (N being an integer greater than 3)), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment base stations (CBRS CPE base station 1 112, CBRS CPE base station 2 152, . . . , CBRS CPE base station X 158, X being integer greater than 2), an ESC system 186, a FCC Database System 182, and a plurality of communications links 122, 124, 126, 128, 130, 132, 134, 136, 138, 140, 142, 144, 146, 170, 172, 173, 176, 178, and 181. The CBRS system 100 is coupled to a network 190, e.g., the Internet, through which various services can be provided such as for example voice over internet call services, video on demand services, video conferencing services. In some embodiments, the network is a part of the CBRS network and the services are provided from CBRS network service providers. In the example system shown in FIG. 1 the CBRS tower base station 1 is illustrated as being coupled or connected to the network 190 via communications link 191 which may be a wired, wireless or optical link. Though not shown the other CBRS tower base stations are also typically coupled or connected to the network 190 via communications links. In some embodiments, the CBRS tower base stations are coupled to a packet gateway system which is part of and located in the network 190.

CBRS CPE base station 1 (CPE BS 1) 112 includes an antenna system 113, e.g., one or more antenna or an antenna area, for communicating with the CBRS tower base stations mounted on a roof of a building 115, e.g., home, located in customer premises 1 114. The antenna being coupled to a portion of the CBRS CPE base station 1 which is located inside the house 115 and which typically also includes separate antennas and interfaces for communicating with user equipment devices located at the customer premises or within its coverage range. CBRS CPE base station 2 (CPE BS 2) 152 is located at the customer premises 2 150 and includes an antenna system 154 located at an elevated position (e.g., mounted on a pole or roof of a building located at the customer premises 2 150) for communicating with CBRS tower base stations. The elevation of the antenna system allows for less obstruction of wireless signals do to other structures and hence provides for a larger geographical area within which it can exchange wireless signals with CBRS tower base stations. CBRS CPE base station X (CPE BS X) 158 is located at the customer premises X 156 and includes an antenna system 160 located at an elevated position (e.g., mounted on a pole or roof of a building located at the customer premises X 156) for communicating with CBRS tower base stations.

SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base 1 102, CBRS tower base station 2 104, CBRS tower base station 3 106, . . . , CBSR tower base station N 108 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and power transmission levels of CBSDs including CBRS tower base stations throughout the CBRS network. While only two SAS devices are shown in FIG. 1 it should be understood that additional SAS devices are typically used in the CBRS network. In some embodiments, one or more of the CBRS tower base stations are also coupled or connected to each other either through wired and/or wireless communications links so that they can communicate and exchange information.

The communications links 122, 124, 126, 128, 136, and 138 are wireless communications links in the 3.5 GHz frequency spectrum band. The communications links 122 couples or connect CBRS tower 1 base station 102 to CBRS CPE base station 1 112. The communications links 124, 126, and 128 are also wireless communications link in the 3.5 GHz frequency spectrum band and couple or connects CBRS tower 2 base station 104, CBRS tower 3 base station 106 and CBRS tower N base station 108 to CBRS CPE base station 1 112 respectively. The communications link 136 is also a wireless communications link in the 3.5 GHz frequency spectrum band that couples or connects CBRS tower N base station 108 to CBRS CPE base station 2 152. The communications link 138 is a wireless communications link in the 3.5 GHz frequency spectrum band that couples or connects CBRS tower base station N 108 to CBRS CPE base station X 158.

Communications links 140, 142, 144, 146, 170, 172, 173, 176, 178, 181 are typically wired communications links or fiber optical cables. Communications links 140, 142, 144, and 146 couple or connect SAS 1 110 to CBRS tower base station 1 102, CBRS tower base station 2 104, CBRS tower base station 3 106 and CBRS tower base station N 108 respectively.

The communications links 130, 132, . . . , 134 couple or connect user equipment device 1 (UE 1) 116, user equipment device 2 (UE 2) 118, . . . , user equipment device M 120 to CBRS CPE 112 respectively. The communications links may be wired, optical or wireless over the air communications links. In some embodiments when the user equipment device is a CBRS wireless device such as a CBRS phone the communications link is a CBRS wireless communications link in the 3.5 GHz frequency spectrum band. In some embodiments, when the user equipment device is a WiFi device the CBRS CPE 112 includes a wireless WiFi interface and the communication link is a wireless WiFi link.

In the example system 100, one or more of the customer premises do not have wired or optical communications links that provide broadband services to the user devices located at the customer premises instead broadband services are provided by the CBRS network by the wireless communications links coupling the CBRS tower base stations to the CBRS CPE base station located at the customer premises.

It is to be understood that the communication links shown in system 100 are only exemplary and other network configurations and communications links may be employed that couple together the devices, base stations, nodes, entities, and databases of the system 100. Elements or steps with the same reference numbers used in different figures are the same or similar and those elements or steps will not be described in detail again.

While for the sake of simplicity in explaining the invention system 100 only illustrates four CBRS tower base station devices, two SAS devices and a few customer premises, CBRS CPE base stations and only a single CBRS CPE base station servicing a few UE devices, it will be appreciated that system 100 typically includes a large plurality of CBRS tower base stations with a large number, e.g., hundreds of customer premises within the CBRS tower base station's coverage range including a CBRS CPE base station which is supporting a plurality of UE devices at the customer premises with the CBRS tower base stations being managed by a plurality of SAS devices which are in communication with one another.

Figure 3:
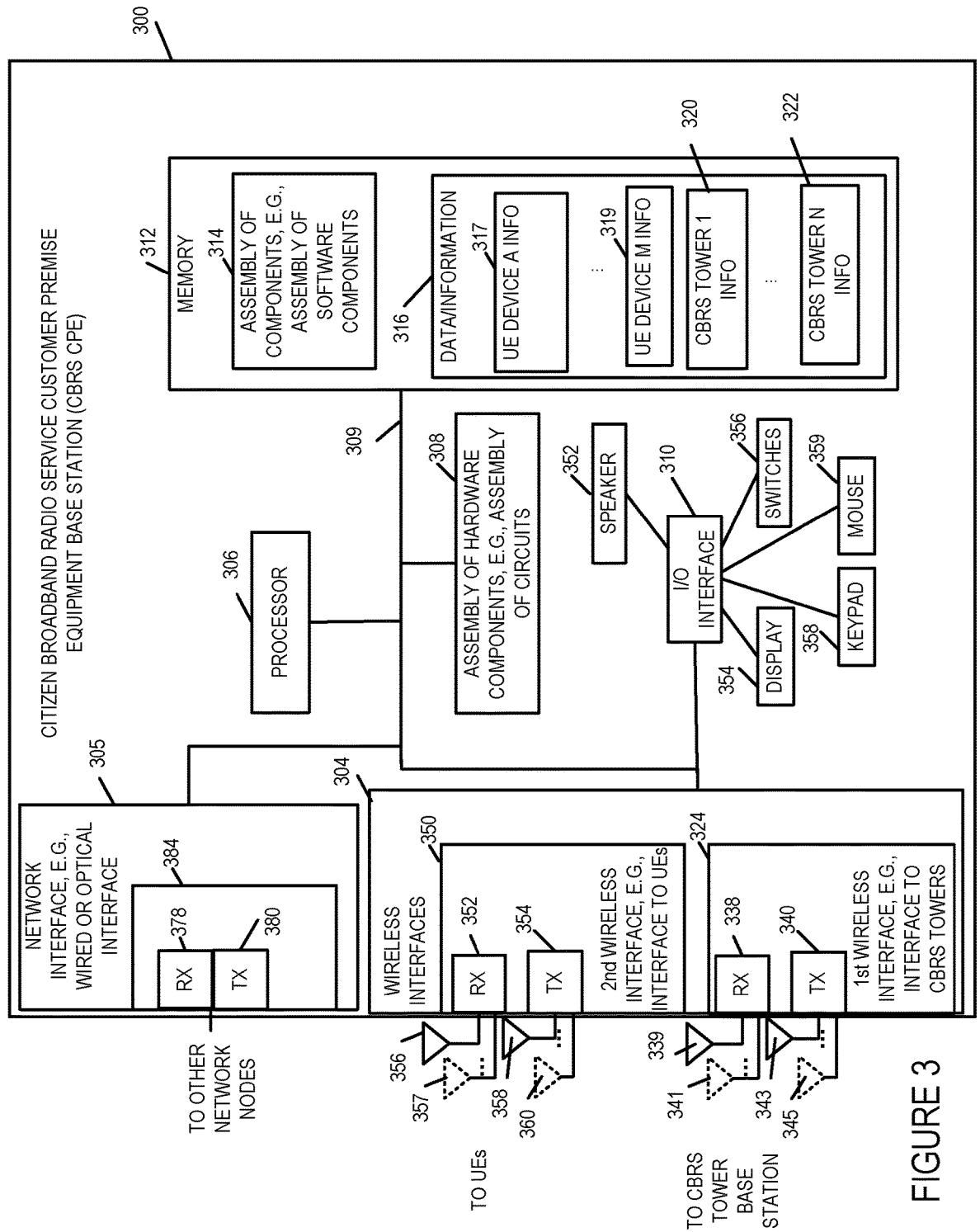
FIG. 3 illustrates details of an exemplary Citizens Broadband Radio Service Customer Premise Equipment (CBRS CPE) base station in accordance with one embodiment of the present invention.

FIG. 3 is a drawing of an exemplary Citizens Broadband Radio Service Customer Premise Equipment base station (CBRS CPE base station) 300 in accordance with an exemplary embodiment. Exemplary CBRS CPE base station 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CBRS CPE base station 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CBSR CPE base station 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with CBRS tower base stations and the second wireless interface 350 is used to communicate with UE devices, e.g., located within the customer premises or home. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, . . . , receive antenna M 341), via which CBRS CPE base station 300 can receive wireless signals from other wireless communications devices including a second wireless communications device, e.g., a CBRS tower base station. Wireless transmitter 340 is coupled to a plurality of wireless transmit antennas (transmit antenna 1 343, . . . , transmit antenna N 345) via which the CBRS CPE base station 300 can transmit signals to other wireless communications devices including a second wireless communications device, e.g., CBRS tower base station. The antennas 339, . . . , 341 and 343, . . . , 345 are typically mounted on the roof of the building in which the CBRS CPE base station is located or on a poll at an elevated height with the other elements of the CBRS CPE base station being connected to the antennas via a wired or fiber optic connection. In some embodiments the various antennas form an antenna array with the antennas pointing in different directions.

The second wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, . . . , receive antenna M 357), via which CBRS CPE base station 300 can receive wireless signals from other wireless communications devices including a second wireless communications device, e.g., UE devices located in the home or on the customer premises such as for example, mobile phones supporting CBRS or Wifi connections. Wireless transmitter 354 is coupled to one or more wireless transmit antennas (transmit antenna 1 358, . . . , transmit antenna N 360) via which the CBRS CPE base station 300 can transmit signals to other wireless communications devices including a second wireless communications device, e.g., e.g., UE devices located in the home or on the customer premises such as for example, mobile phones supporting CBRS or Wifi connections. The CBRS CPE network interface 305 may be coupled to LAN networks, WANs, routers, e.g., WiFi routers, so that various devices in the home without wireless interfaces can also be serviced via wired or optical links by the CBRS CPE base station 300.

Memory 312 includes an assembly of component 314, e.g., an assembly of software components, and data/information 316. Data/information 316 includes UE device information corresponding to a plurality of user equipment devices (UE device A information 317, . . . , UE device M information 319 where A to M are the UE devices being serviced by the CBRS CPE base station) and CBRS tower base station information (CBRS base station 1 information 320, . . . , CBRS base station N information 322). In some embodiments, one or more of CBRS CPE base station 1 112, CBRS CPE base station 2 152, . . . , CBRS CPE base station X 158, and CBRS CPE base station 1502 are implemented in accordance with CBRS CPE base station 300.

Figure 4:
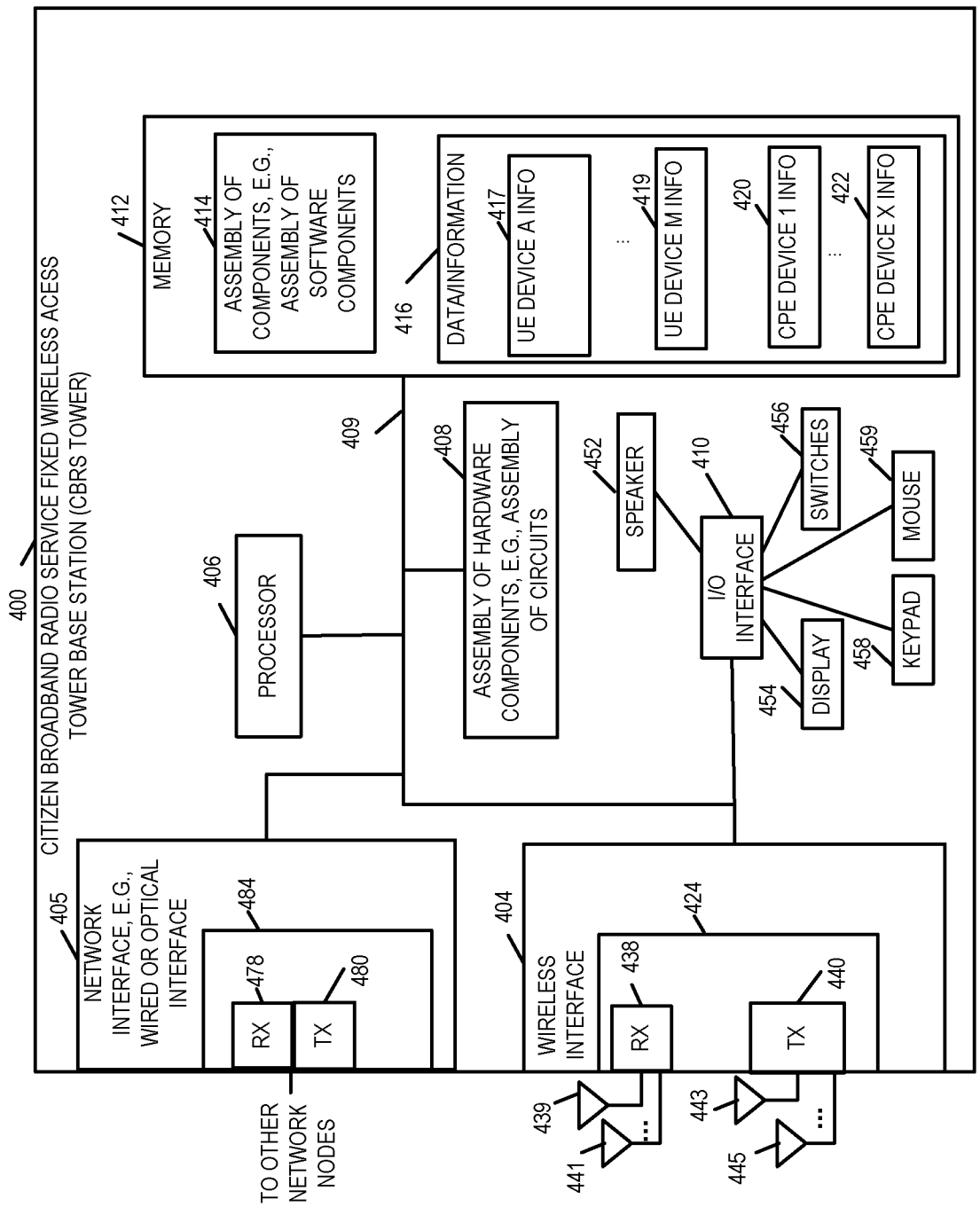
FIG. 4 illustrates details of an exemplary Citizens Broadband Radio Service tower base station (CBRS tower or CBRS tower base station) in accordance with one embodiment of the present invention.

FIG. 4 is a drawing of an exemplary Citizens Broadband Radio Service Fixed Wireless Access Tower Base Station (CBRS tower base station) 400 in accordance with an exemplary embodiment. Exemplary CBRS tower base station 400 includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBRS tower base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the CBSR tower base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 424. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBRS tower base station 400 can receive wireless signals from other wireless communications devices including a second wireless communications device, e.g., a UE device or a CBRS CPE base station. Wireless transmitter 440 is coupled to a plurality of wireless transmit antennas (transmit antenna 1 443, . . . , transmit antenna N 445) via which the CBRS tower base station 400 can transmit signals to other wireless communications devices including a second wireless communications device, e.g., a UE device or a CBRS CPE base station. Memory 412 includes an assembly of component 414, e.g., an assembly of software components, and data/information 416. Data/information 416 includes UE device information corresponding to a plurality of user equipment devices (UE device A information 417, . . . , UE device M information 419 where A to M are the UE devices being serviced by the CBRS tower base station) and CBRS CPE base station information (CPE base station device 1 information 420, . . . , CPE base station device X information 422). In some embodiments, the CBRS tower base station 400 only provides services to CBRS CPE base stations and does not provide services directly to UE devices. In some embodiments the CBRS tower base station 400 primarily serves CBRS CPE base stations but also serves UE devices. In some embodiments, one or more of CBRS Tower 1 102, CBRS Tower 2 104, CBRS Tower 3 106, . . . , CBRS Tower N 108 are implemented in accordance with CBRS fixed wireless access tower base station 400.

Figure 5:
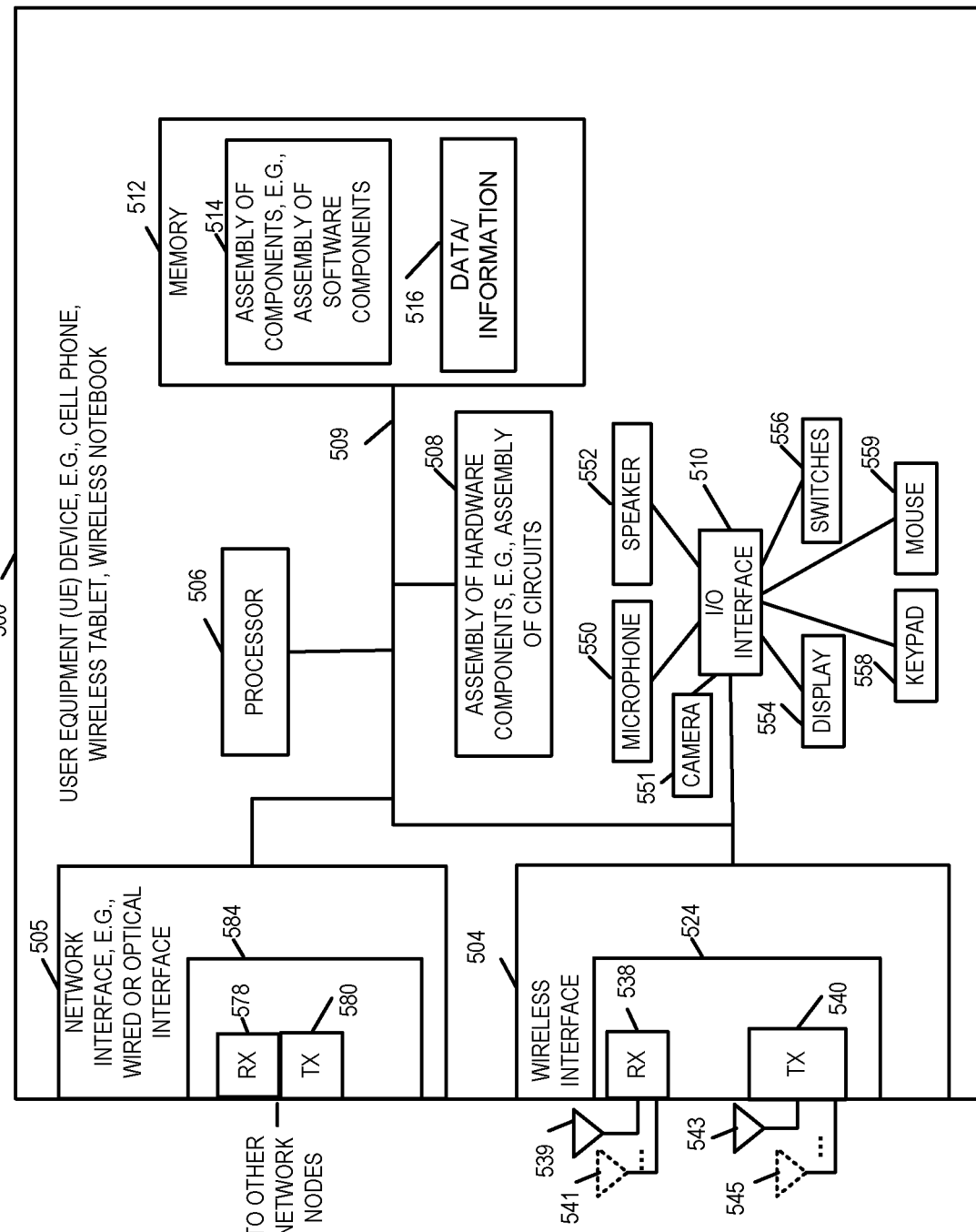
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500, in some embodiments, includes WiFi mobile device capabilities. UE device 500, may be a CBRS user equipment device operating at the 3.5 GHz band. Exemplary UE device 500 includes a wireless interface 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBRS CPE base station such as CBRS CPE base station 300, wireless router (e.g., a WiFi router). Wireless transmitter 540 is coupled to one or more wireless transmit antennas (transmit antenna 1 543, . . . , transmit antenna N 545) via which the UE device 500 can transmit signals to other wireless communications device including a CBRS CPE base station, e.g., a CBRS CPE base station 300 or a wireless router (e.g., a WiFi router). Memory 512 includes an assembly of components 514, e.g., an assembly of software components, and data/information 516. In some embodiments, one or more UE devices UE 1 116, UE 2 118, ..., UE M 102 are implemented in accordance with exemplary user equipment device 500.

Figure 6:
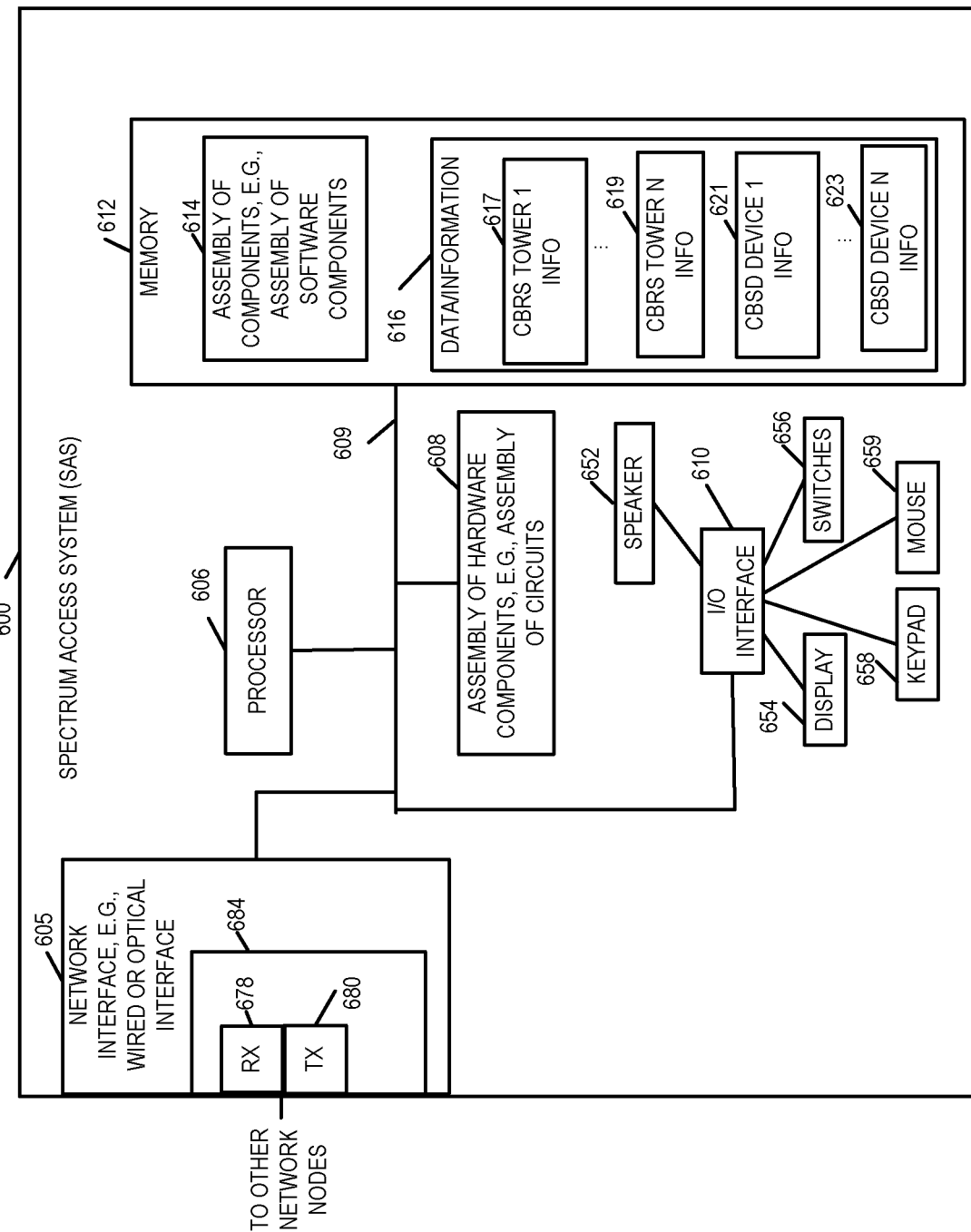
FIG. 6 illustrates details of an exemplary Spectrum Access System device (SAS) in accordance with one embodiment of the present invention.

FIG. 6 is a drawing of an exemplary Spectrum Access System (SAS) device 600 in accordance with an exemplary embodiment. The SAS 600 includes, among other things, the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, an I/O interface 610 and memory 612 coupled together via a bus 609 over which the various elements may interchange data and information. SAS 600 further includes a speaker 652, a display 654, switches 656, keypad 658 and mouse 659 coupled to I/O interface 610, via which the various I/O devices (652, 654, 656, 658, 659) may communicate with other elements (605, 606, 608, 612) of the SAS 600. Network interface 605 includes a receiver 678 and a transmitter 680. The network interface 605 is typically used to communicate with other SAS devices and CBSD devices including CBRS tower base stations. In some embodiments, receiver 678 and transmitter 680 are part of a transceiver 684. Memory 612 includes an assembly of component 614, e.g., an assembly of software components, and data/information 616. Data/information 616 includes CBRS tower base station information CBRS tower 1 information 617, ..., CBRS tower N information 619 where N is an integer number greater than 1. In some embodiments CBRS CPE base station information is also stored in data/information 616 of memory 612. Data/information 616 also includes CBSD device information corresponding to a plurality of CBSD devices (CBSD device 1 information 621, ..., CBSD device N information 623, where N is an integer number). Data/Information 616 typically includes CBDS device transmission power and spectrum allocation information including CBRS tower base station transmission power and spectrum allocations. While CBRS tower base station information has been shown separately from other CBSD devices, this has been done for explanatory purposes however it is to be understood that CBRS tower base stations are CBSD devices. In some embodiments, SAS 1 110 and SAS 2 184 are implemented in accordance with SAS 600.

Figure 7:
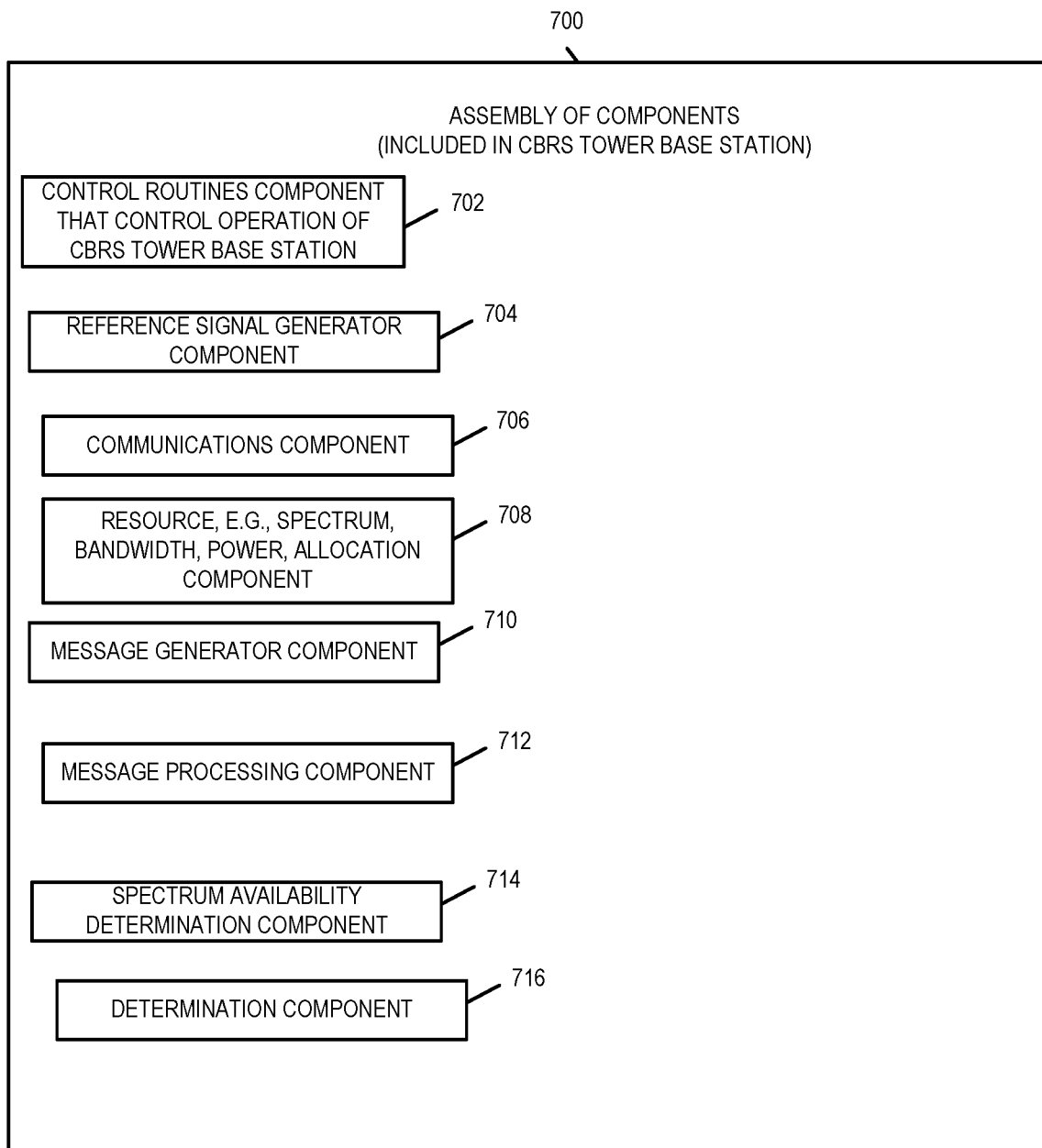
FIG. 7 illustrates an exemplary assembly of components for a CBRS tower base station in accordance with an embodiment of the present invention.

FIG. 7 is a drawing of an exemplary assembly of components 700 which may be included in an exemplary CBRS tower base station device, e.g., exemplary CBRS tower base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBRS tower base station device 400, with the components controlling operation of CBRS tower base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBRS tower base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a reference signal generator component 704, a communications component 706, a resource, e.g., spectrum, bandwidth, power, allocation component 708, a message generator component 710, a message processing component 712, a spectrum availability determination component 714, and determination component 716. The control routines component 702 is configured to control operation of the CBRS tower base station. The reference signal generator component 704 generates a reference signal which is sent over the air to devices within the CBRS tower base station coverage area, e.g., CBRS CPE base stations. The communications component 706 is configured to handle communications, e.g., transmission and reception of messages, and protocol signaling for the CBRS tower base station. The resource allocation component 708 allocates spectrum (e.g., frequency bandwidth) and/or power for CBRS CPE base stations and CBRS user equipment devices to which it is providing services. The message generator component 710 is configured to generate messages for transmission to other devices. The message processing component 712 is configured to process received messages and is sometimes a sub-component of communications component 706. The spectrum availability determination component 714 determines the available spectrum that the CBRS tower base station has available and in some embodiments the amount of time for which it is available. The determination component 716 makes various determinations for the CBRS tower base station including determining amount of spectrum to request from the SAS, power level to use for transmissions, amount of spectrum to reserve for control signaling with CBRS CPE base stations for which it is a primary CBRS tower base stations.

Figure 8:
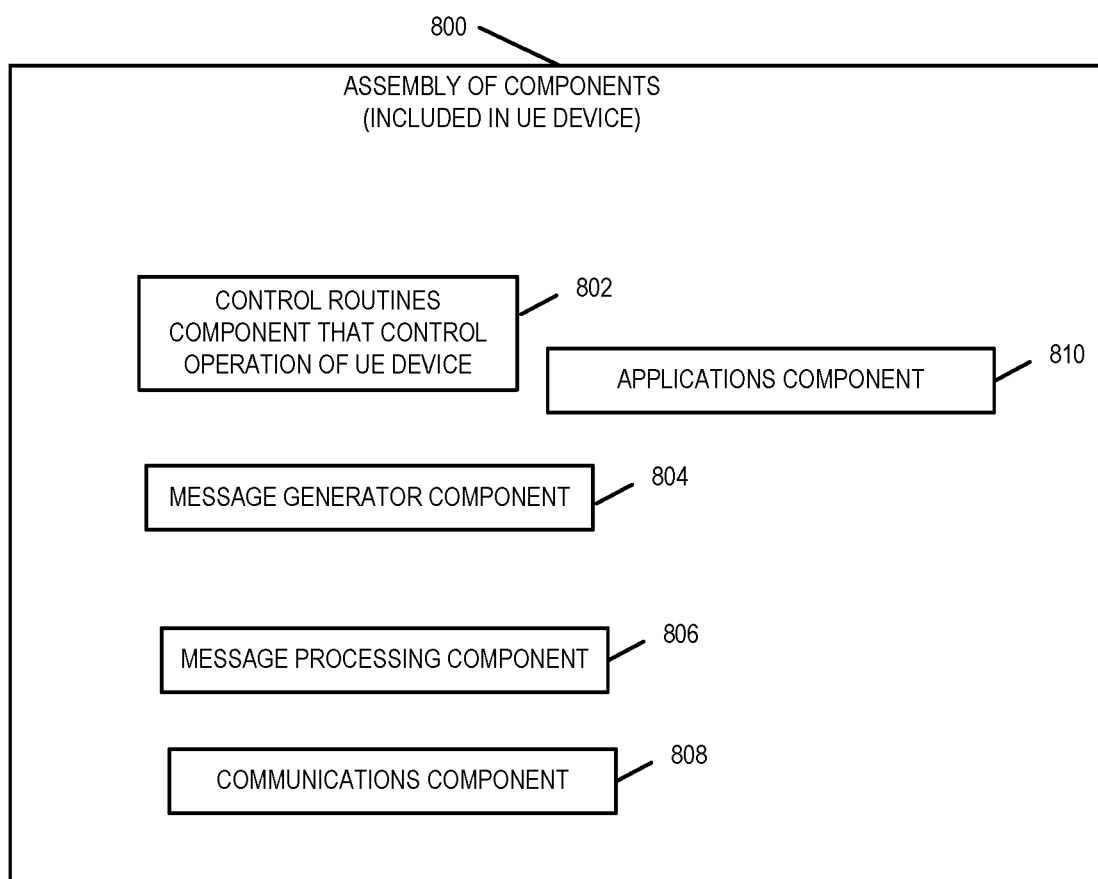
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, and an applications component 810. The control routines component 802 is configured to control operation of the UE. The message generator component 804 is configured to generate messages for transmission to CBRS CPE devices. The message processing component 806 is configured to process messages received from other devices, e.g., a CBRS CPE base station. In some embodiments, the message processing component 806 is a subcomponent of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc.

Figure 9:
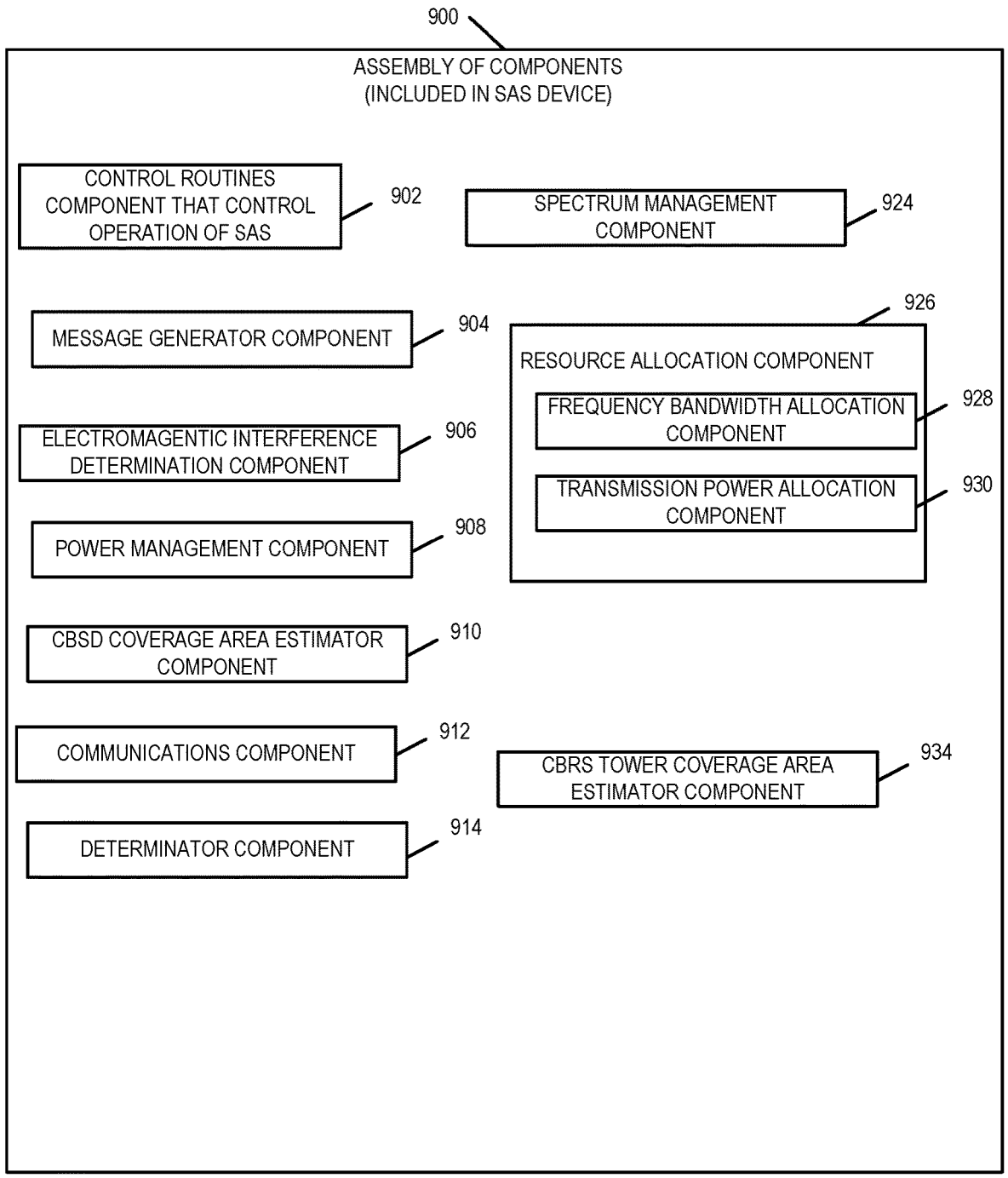
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, a power management component 908, a CBSD coverage area estimator component 910, a communications component 912, a determinator component 914, a spectrum management component 924, a resource allocation component 926, a CBRS tower base station coverage area estimator component 934. The resource allocation component 926 includes in a frequency bandwidth allocation component 928 and a transmission power allocation component 930. The control routines component 902 is configured to control operation of the SAS. The message generator component 904 is configured to generate messages for transmission to CBSD devices including CBRS tower base stations, e.g., resource allocations messages including spectrum or frequency bandwidth allocated to a CBSD (e.g., CBRS tower base station) and transmission power allocations for the CBSD (e.g., CBRS tower base station). The electromagnetic interference determination component 906 is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference and in some embodiments is a sub-component of the resource allocation component 926.

The power management component 908 determines the power transmission levels for CBSDs, e.g., CBRS tower base stations, managed by the SAS and in some embodiments are sub-components of the resource allocation component 926. The CBSD coverage area estimator component 910 estimates the coverage area of a CBSD device. The spectrum management component 924 is configured to manage the allocation of frequency spectrum in the CBRS network including frequency bandwidth allocated to CBSDs managed by the SAS. In some embodiments, the spectrum management component 924 is a sub-component of resource allocation component 926. The communications component 912 is configured to handle communications between the SAS and other nodes, e.g., CBSD device (e.g., CBRS tower base stations), FCC database, ESC system including receipt and transmission of messages and protocol signaling. The resource allocation component 926 is configured to allocate resources including for example spectrum, e.g., frequency bandwidth, allocations and/or transmission power allocations for CBSDs, e.g., CBRS tower base stations, managed by the SAS and based on estimations of the CBSDs' coverage area. In some embodiments, the resource allocation component 926 includes sub-components frequency bandwidth allocation component 928 and transmission power allocation component 930. The frequency bandwidth allocation component 928 is configured to allocate frequency bandwidth for a CBSD, e.g., a CBRS tower base station, based on the estimated coverage area of the CBSD. The transmission power allocation component 930 is configured to allocate transmission power to a CBSD based on the estimated coverage area of the CBSD. The CBRS tower base station coverage area estimator component 934 estimates the coverage area of a CBRS tower base station. In some embodiments, CBRS tower base station coverage area estimator component 934 is a sub-component of the CBSD coverage area estimator component 910.

Figure 10:
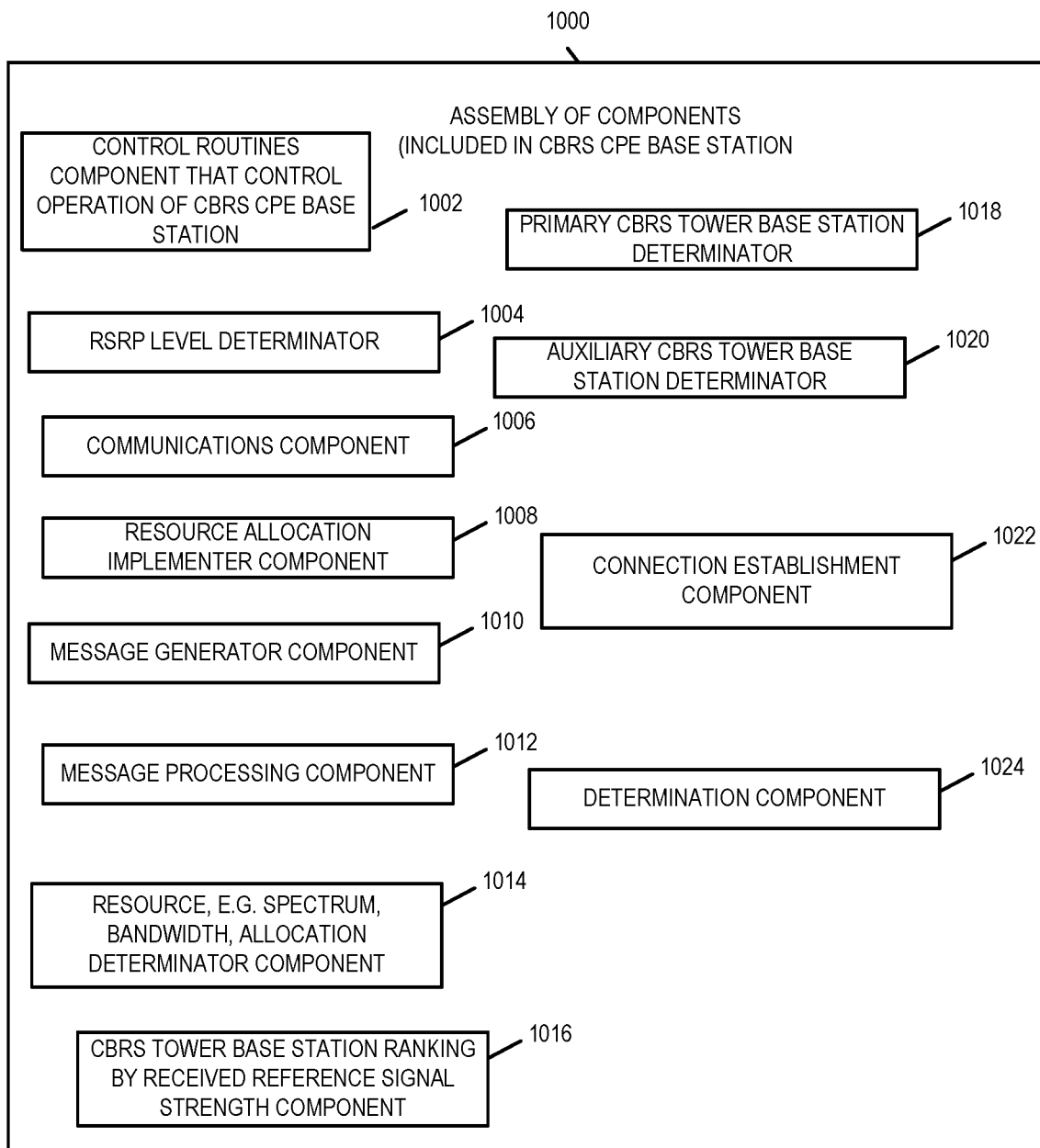
FIG. 10 illustrates an exemplary assembly of components for a CBRS CPE base station in accordance with an embodiment of the present invention.

FIG. 10 is a drawing of an exemplary assembly of components 1000 which may be included in an exemplary CBRS CPE base station device, e.g., exemplary CBRS CPE base station 300 of FIG. 3, in accordance with an exemplary embodiment. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CBRS CPE base station device 300, with the components controlling operation of CBRS CPE base station device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CBRS CPE base station device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1002, Reference Signal Received Power level determinator 1004, a communications component 1006, a resource allocation implementer component 1008, a message generator component 1010, a message processing component 1012, a resource, e.g., spectrum, bandwidth, allocation determinator component 1014, a CBRS tower base station ranking by received reference signal strength component 1016, a primary CBRS tower base station determinator component 1018, an auxiliary CBRS tower base station determinator component 1020, a connection establishment component 1022, and a determination component 1024.

The control routines component 1002 controls the operation of the CBRS CPE base station. The RSRP level determinator component 1004 generates, measures and/or determines the Reference Signal Received Power level from a reference signal received from a CBRS tower base station.

The communications component 1006 performs operations for handling communications with other devices including generation, transmission, receiving, and processing messages, establishing connections, signal processing for different communications protocols. The resource allocation implementer component 1008 handles operations for allocation of resources, e.g., spectrum usages for various devices being serviced by the CBRS CPE base stations as well as reservation and usage of resources, e.g., spectrum, from primary and auxiliary CBRS tower base stations.

The message generator component 1010 generates messages, e.g., request spectrum availability messages, spectrum reservation requests, acceptance, rejection and confirmation messages. In some embodiments, the message generator component 1010 is a sub-component of communications component 1006.

The message processing component 1012 processes received messages, e.g., requests for services and/or resources, e.g., spectrum, from user equipment devices or messages such as for example messages including spectrum availability from CBRS tower base stations. In some embodiments, the message processing component 1012 is a sub-component of the communications component 1006.

The resource determinator allocation component 1014 determines the load on the CBRS CPE base station from the devices it services, e.g., UEs at the customer premises at which the CBRS CPE base station is located, the amount of spectrum allocated by primary and auxiliary CBRS tower base stations, the amount of additional spectrum required in excess of the amount of spectrum allocated by the primary CBRS tower base station, reserves spectrum from CBRS tower base stations for device to device communications with the CBRS tower base stations, allocates spectrum to wireless UE devices for communications between the UE devices and the CBRS CPE base station.

The CBRS tower base station ranking component 1016 ranks CBRS tower base stations from which the CBRS CPE base stations receives a reference signal by the strength of the reference signal received in comparison to the strength of the reference signals received from other CBRS tower base stations.

The primary CBRS tower base station determinator component 1018 selects or determines a CBRS tower base station to be a primary CBRS tower base station for communications between the CBRS CPE base station and the CBRS network CBRS tower base stations. The primary CBRS tower base station determination is typically based on the strength of the reference signal received from a plurality of the CBRS tower base stations with the CBRS tower base station with the strongest RSRP level being selected as the primary CBRS tower base station even if it has less spectrum available than other CBRS tower base stations.

The auxiliary CBRS tower base station determinator component 1020 determines which CBRS tower base stations from which the CBRS CPE base station received a reference signal will be designated as auxiliary CBRS tower base stations.

The connection establishment component 1022 handles establishment and termination of communications connections, e.g., device to device communications connections between the CBRS tower base stations and the CBRS CPE base stations and the communications connections with devices being serviced by the CBRS CPE base station. In some embodiments, the connection establishment component 1022 is a sub-component of communications component 1006.

The determination component 1024 makes various determinations for the CBRS CPE base station including determining: the amount of spectrum to request from auxiliary CBRS tower base stations, the amount of load caused by the services requested by the devices the CBRS CPE base station is servicing, the amount of spectrum to reserve from each CBRS tower base station, and which CBRS tower base station has the strongest RSRP level. The determination component 1024 also determines in some embodiments the reference signal received power from received reference signal transmissions, the amount of spectrum to reserve for control signaling with CBRS tower base stations and in some embodiments, which CBRS tower base stations are to be selected as the primary CBRS tower base station and which CBRS tower base stations are to be designated as auxiliary CBRS tower base stations.

Figure 2A:
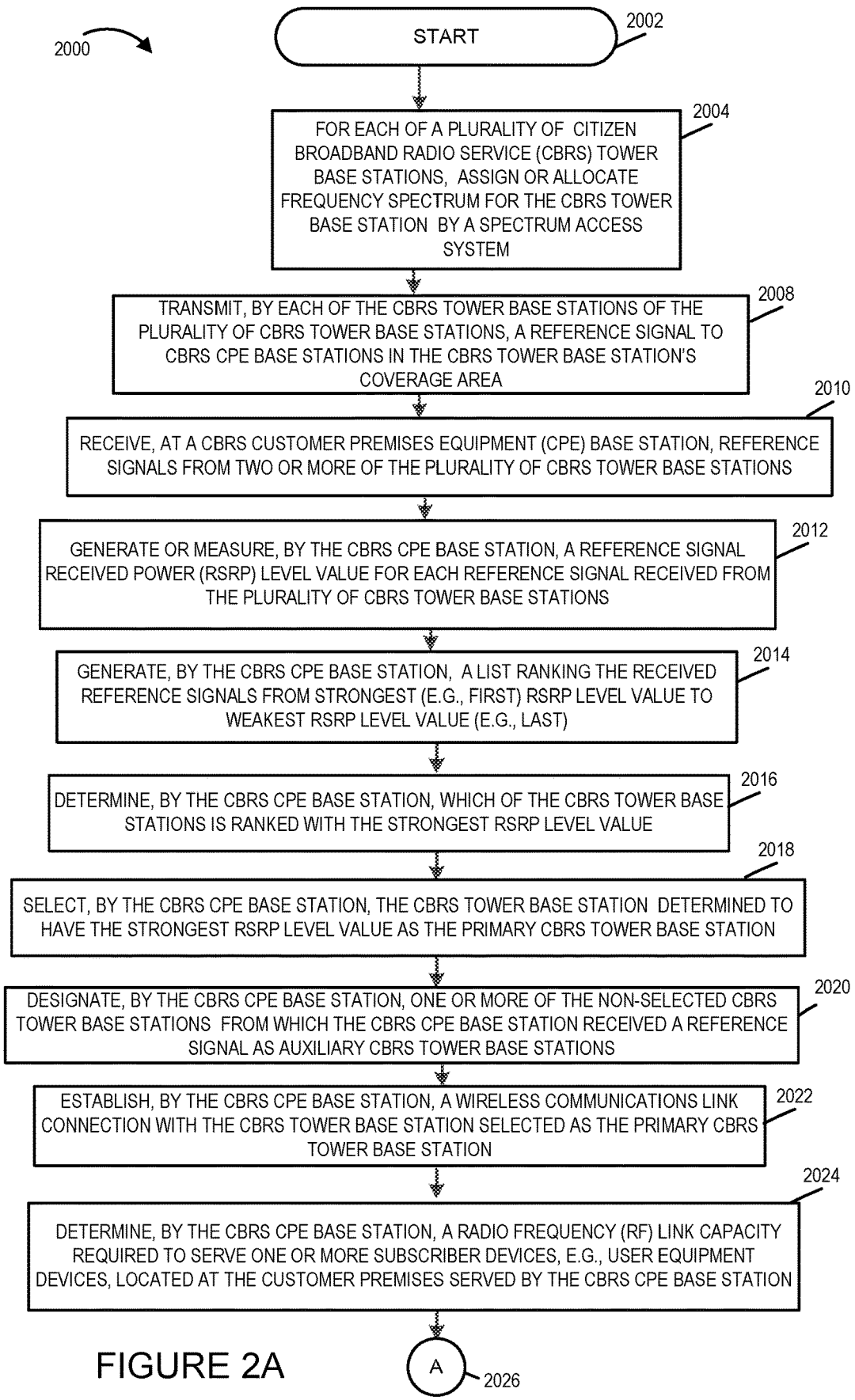
FIG. 2A illustrates the steps of the first part of an exemplary method in accordance with one embodiment of the present invention.
Figure 2C:
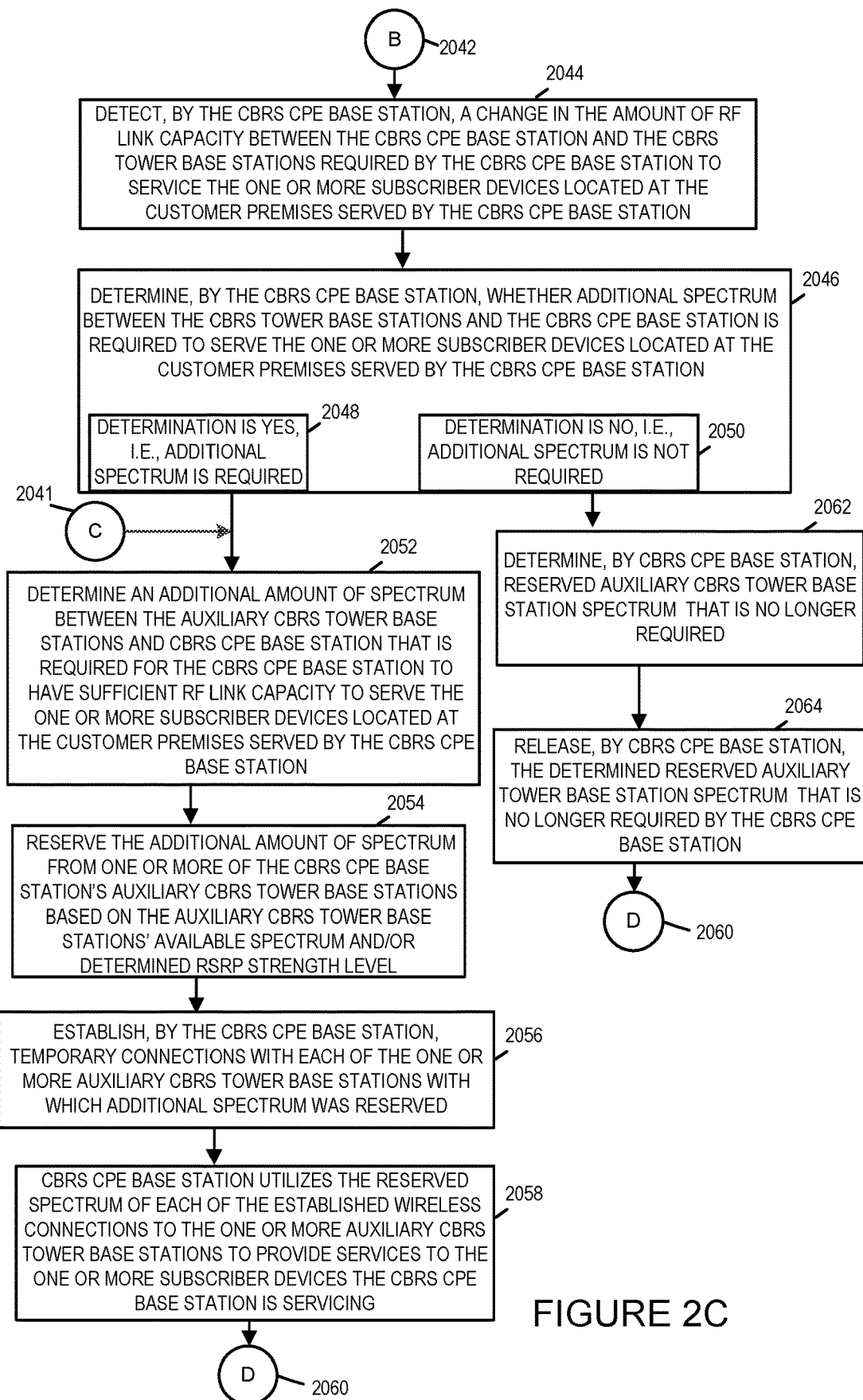
FIG. 2C illustrates the steps of the third part of an exemplary method in accordance with one embodiment of the present invention.

FIG. 2, which comprises the combination of FIGS. 2A, 2B and 2C illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention.

For explanatory purposes the exemplary method 2000 will be explained in connection with the exemplary CBRS network system 100 illustrated in FIG. 1 although it should be understand that the method may be implemented using other systems and other system configurations then those illustrated in FIG. 1. In this example, N=4 so that there are four CBRS tower base stations, M=3 so that there are 3 user equipment devices being serviced by the CBRS CPE 1 base station 112, and X=3 so that there are three customer premises and three CBRS CPE base stations being serviced by the CBRS tower 4.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, for each of a plurality of Citizen Broadband Radio Service (CBRS) tower base stations, frequency spectrum is assigned or allocated by an SAS device with which the CBRS tower base station is registered. In the exemplary system 100, CBRS tower base station 1 102, CBRS tower base station 2 104, CBRS tower base station 3 106 and CBRS tower base station N 108 are registered with System Access System 110. The SAS 1 110 allocates or assigns resources to each of the CBRS tower base stations 1 102, 2 104, 3 106 and N 108. The resources include frequency spectrum (e.g., bandwidth) and power transmission levels. The SAS 1 110 makes these allocations and/or assignments based on the geographical locations of each of the CBRS tower base stations with the objective being to efficiently allocate/assign the frequency spectrum to limit or minimize interference in the CBRS network. Operation proceeds from step 2004 to step 2008.

In step 2008, each of the CBRS tower base stations of the plurality of CBRS tower base stations transmits a reference signal to CBRS CPE base stations within the CBRS tower base station's coverage area. Operation proceeds from step 2008 to step 2010.

In step 2010, a CBRS CPE base station, e.g., CBRS CPE base station 1 112, receives reference signals from two or more of the plurality of CBRS tower base stations. In the example of CBRS CPE base station 1 112 of system 100, it receives a reference signal from CBRS tower base station 1 102, CBRS tower base station 2 104, CBRS tower base station 3 106 and CBRS tower base station N 108. The CBRS CPE base station 2 152 receives a reference signal from CBRS tower base station N 108. The CBRS CPE base station X 158 receives a reference signal from CBRS tower base station N 108. Operation proceeds from step 2010 to step 2012.

In step 2012, the CBRS CPE base station, generates or measures a reference signal received power (RSRP) level value for each reference signal received from the plurality of CBRS tower base stations. FIG. 11 illustrates a table 1100 showing exemplary RSRP level values in decibel milliwatts (dBm) determined by the CBRS CPE base station 1 for each of the reference signals received from the CBRS tower base station 1 102, CBRS tower base station 2 104, CBRS tower base station 3 106, and CBRS tower base station N 108 (N=4). The RSRP level being a measurement of the received power level of the reference signal sent by the CBRS tower base station. The table 1100 further shows the CBRS tower base stations ranked from strongest to weakest RSRP level. In some embodiments, the RSRP value is determined or measured in the same manner in which Long Term Evolution (LTE) RSRP is measured, e.g., by measuring a single Resource Element of a Resource Block. The RSRP is measured over a narrow bandwidth. The RSRP being an average received power of a single Resource Element. The 3rd Generation Partnership Project (3GPP) 36.214 specification provides a formal definition for Reference Signal Received Power for LTE. Operation proceeds from step 2012 to step 2014.

In step 2014, the CBRS CPE base station generates a list ranking the received RSRP signals from strongest (e.g., first) RSRP level value to weakest RSRP level value (e.g., last). The table 1100 in FIG. 11 illustrates the ranking of the RSRP levels determined by the CBRS CPE base station 1 112 for example values used in connection with system 100. FIG. 11 will now be explained in further detail. FIG. 11 illustrates an exemplary table 1100 showing CBRS tower base stations 1, 2, 3, . . . , N (where N=4) ranked from strongest to weakest RSRP level values as determined by CBRS CPE 1 112 of system 100. Row 1118 of table 1100 illustrates labels identifying the information contained in each column and is not data. The entries in column 1102 of table 1100 include CBRS tower base station identifiers for the CBRS tower base stations from which the CBRS CPE base station 1 112 received a reference signal. The entries in column 1104 of table 1100 include ranking information for the CBRS tower base station identified in the same row. The entries in column 1106 of table 1100 include the measured or determined Reference Signal Received Power level for the CBRS tower base station identified in the same row. The entries of row 1120 indicate CBRS tower base station 1 102 has 1 ranking indicating it has the strongest reference signal power level of the reference signals received by the CBRS CPE tower base station 1 112 and the RSRP level was −95 dBm. The entries of row 1122 indicate CBRS tower base station 2 104 was ranked by the CBRS CPE tower base station 1 112 as number 2 indicating it has the second strongest reference signal received power level and that the RSRP level was measured or determined by the CBRS CPE 1 112 to be −115 dBm. The entries of row 1124 indicate CBRS tower base station 3 106 was ranked by the CBRS CPE tower base station 1 112 as number 3 indicating it has the third strongest reference signal received power level and that the RSRP level was measured or determined by the CBRS CPE 1 112 to be −117 dBm. The entries of row 1126 indicate CBRS tower base station N=4 108 was ranked by the CBRS CPE tower base station 1 112 as number 4 indicating it has the fourth strongest reference signal received power level and that the RSRP level was measured or determined by the CBRS CPE 1 112 to be −120 dBm. The CBRS tower base station N=4 having the weakest RSRP level of the CBRS tower base stations from which the CBRS CPE base station 1 112 received reference signals. Operation proceeds from step 2014 to step 2016.

In step 2016, the CBRS CPE base station determines which of the CBRS tower base stations is ranked with the strongest Reference Signal Received Power (RSRP) level value. In this example, a review of table 1100 shows that CBRS tower base station 1 102 with a RSRP value of −95 dBm is the CBRS tower base station with the strongest Reference Signal Received Power value ranking. Operation proceeds from step 2016 to step 2018.

In step 2018, CBRS CPE base station selects the CBRS tower base station determined to have strongest Reference Signal Received Power level value as the CBRS CPE base station's primary CBRS tower base station. This is the CBRS tower base station that CBRS CPE base station will establish its primary or main communications link with for sending and receiving control signaling and data on an on-going basis. In some embodiments, the CBRS CPE base station registrars with the CBRS tower base station indicating that the connection is the main or primary connection for the CBRS CPE base station and is to have an on-going connection not a temporary connection. In the example of system 100, the CBRS CPE base station 1 112 selects the CBRS tower base station 1 102 to be its primary base station. FIG. 12 illustrates a table 1100' in which column 1108 entries indicate the designation of the CBRS tower base stations and column 1110 entries indicate the status of the connection with the CBRS CPE base station 1 112. Table entry row 1120', column 1108 indicates that CBRS tower base station 1 102 is designated or selected to be CBRS CPE base station 1 112's primary CBRS tower base station. Operation proceeds from step 2018 to step 2020.

In step 2020, the CBRS CPE base station designates one or more of the non-selected CBRS tower base stations from which it has received a reference signal as its auxiliary CBRS tower base stations. The CBRS CPE base station typically designates all of the remaining CBRS tower base stations from which it is receiving a reference signal as auxiliary CBRS tower base stations. The CBRS CPE base stations negotiates the temporary use of resources and services, e.g., frequency spectrum bandwidth for communications, with the auxiliary CBRS tower base stations on a temporary as needed basis. The auxiliary CBRS tower base stations are sometimes referred to as temporary CBRS tower base stations. In the exemplary system 100, the CBRS tower base station 2 104, CBRS tower base station 3 106, and CBRS tower base station N 108 are designated as CBRS CPE base station 1 112's auxiliary CBRS tower base stations. Table 1100' of FIG. 12 illustrates in row 1122', column 1108 that CBRS tower base station 2 104 is designated as an auxiliary base station for CBRS CPE base station 1 112.

Table 1100' of FIG. 12 illustrates in row 1124', column 1108 that CBRS tower base station 3 106 is designated as an auxiliary base station for CBRS CPE base station 1 112. Table 1100' of FIG. 12 illustrates in row 1126', column 1108 that CBRS tower base station N=4 108 is designated as an auxiliary base station for CBRS CPE base station 1 112. Operation proceeds from step 2020 to step 2022.

In step 2022, the CBRS CPE base station establishes a wireless communications link connection with the CBRS tower base station selected as the primary CBRS tower base station. In the exemplary system 100, the CBRS CPE 112 establish wireless communications link 122 with CBRS tower base station 1 102. This is the CBRS CPE base station 1 112's main wireless communications link with the CBRS network. The main connection is not a temporary connection but is one that the CBRS CPE base station 1 112 maintains for use with control and signaling information. The CBRS CPE base station 1 112 will keep this communications link connection alive even when it uses auxiliary CBRS tower base stations on a temporary basis when the primary CBRS tower base station does not have sufficient spectrum resources to support the CBRS CPE base station's requirements. Table 1100' shown in FIG. 12 includes column 1110 which indicates the CPE base station connection status with the various CBRS tower base stations. Entry row 1120', column 1110 shows that the CBRS tower base station 1 102 designated as the CBRS CPE base station 1 112's primary CBRS tower base station 1 has a connection status of main indicating that it is the CBRS CPE base station 1 112's main non-temporary connection to the CBRS network. While a wireless link is established with the primary CBRS tower base station and kept alive, the CBRS CPE base station establishes communications links with its auxiliary CBRS tower base stations on a temporary as needed basis establishing the wireless communications when needed and tearing down the wireless communications link after determining the need no longer exists. Operation proceeds from step 2022 to step 2024.

In step 2024, the CBRS CPE base station determines, estimates or measures a radio frequency (RF) link capacity required for the one or more subscriber devices, e.g., user devices, located at the customer premises served by the CBRS base station and/or within the coverage area of the CBRS CPE base station. The one or more users are typically all users that the CBRS base station is servicing in its coverage area. In the exemplary system 100, the CBRS CPE base station 112 determines the resources, i.e., the RF link capacity, it will require for providing services to user equipment devices UE 1 116, UE 2 118, and UE M 120 which are located at the customer premises 1 114. In an embodiment the CBRS CPE base station determines the RF link capacity required based on one or more of the following: requests for physical resource block (PRB) resources from one or more subscriber devices being serviced, the type of services being provided to the one or more subscriber devices, the physical resource blocks being utilized by the one or more subscriber devices being serviced, data reflecting past history reflecting link capacity and/or spectrum required to support the one or more subscriber devices at the customer premises being serviced, quality of service agreements with the subscriber, or required for the service to be provided. In some embodiments, the CBRS CPE base station makes an estimate of the RF link capacity required to support all of the subscriber devices in its coverage area so as limit, minimize and/or prevent service interruptions. This includes adding an additional amount of capacity beyond what is measured or calculated to be sufficient. Operation proceeds from step 2024 to optional step 2028 shown on FIG. 2B via connection node A 2026 or if optional step 2028 is not implemented to step 2032.

In step 2028, the CBRS CPE base station requests an allocation/assignment of spectrum from the primary CBRS tower base station. In some embodiments, step 2028 includes sub-step 2030. In sub-step 2030 the CBRS CPE base station determines an amount of spectrum to request be allocated based on the determined RF link capacity required to serve the one or more CBRS subscriber devices located at the customer premises served by the CBRS CPE base station. In the example of system 100, the CBRS CPE base station 1 112 would request an amount of spectrum be allocated which would provide enough link capacity for providing services to user equipment devices UE 1 116, UE 2 118, and UE M 120 which are located at the customer premises 1 114. Operation proceeds from step 2028 to step 2032.

In step 2032, the CBRS CPE base station receives spectrum allocation information from the primary CBRS tower base station. The spectrum allocation information includes information about the frequency band and amount of frequency spectrum or bandwidth allocated by the primary CBRS tower base station for communications between the CBRS CPE base station and the primary CBRS tower base station. The primary CBRS tower base station in some embodiments makes its determination of the amount of spectrum or bandwidth to allocate the CBRS CPE base station based one or more of the following: (i) the amount of spectrum the primary CBRS tower base station has been allocated by the SAS 1 110, (ii) the amount of spectrum requested by the CBRS CPE base station, (iii) the number of CBRS CPE base stations for which it is the primary CBRS tower base station, (iv) the amount of spectrum requested by other CBRS CPE base stations for it is serving as the primary CBRS tower base station, (v) the amount of spectrum requested by other CBRS CPE base stations for which it is serving as an auxiliary CBRS tower base station, (vi) the amount of spectrum already reserved by the CBRS tower base station for other purposes, (vii) the amount of spectrum requested by or reserved for use by CBRS user equipment devices being serviced by the CBRS tower base stations, and/or (viii) the amount of spectrum available to the CBRS tower base station. Operation proceeds from step 2032 to step 2034.

In step 2034, the CBRS CPE base station determines the CBRS RF link capacity between the CBRS CPE base station and the primary CBRS tower base station, e.g., based on the amount of spectrum allocated by the primary CBRS tower base station to the CBRS CPE base station. Operation proceeds from step 2034 to decision step 2036.

In decision step 2036, the CBRS CPE base station determines whether the determined RF link capacity between the primary CBRS tower base station and the CBRS CPE base station is sufficient to serve the one or more CBRS subscriber devices located at the customer premises served by the CBRS CPE base station. When the decision in step 2036 is yes that the determined RF link capacity between the primary CBRS tower base station and the CBRS CPE base station is sufficient to serve the one or more CBRS subscriber devices located at the customer premises served by the CBRS CPE base station operation proceeds from decision step 2036 to step 2038. Otherwise, operation proceeds from decision step 2036 via connection node C 2041 to step 2052 shown on FIG. 2C.

In step 2038, the CBRS CPE base station utilizes the wireless connection established with the primary CBRS tower base station and the spectrum allocated by the primary CBRS tower base station to provide services to the one or more subscriber devices the CBRS CPE base station is servicing. Operation proceeds from step 2038 to step 2040.

In step 2040, the CBRS CPE base station monitors for a change in the RF link capacity required to serve the one or more subscriber devices located at the customer premises served by the CBRS CPE base station. For example, the CBRS CPE base station monitors for a change in its load based on for example the addition of subscriber devices that need to be supported or the type of service being requested, e.g., video on demand services being requested which requires additional RF link capacity as more data is required to be transferred to support the video on demand service requested. Or, the change in load may be a reduction in load because a video on demand service has ended or a subscriber device has terminated services for example by ending a call. Operation proceeds from step 2040 via connection node B 2042 to step 2044 shown on FIG. 2C.

In step 2044, the CBRS CPE base station detects a change in the amount of RF link capacity between the CBRS CPE base station and the CBRS CPE tower base stations required by the CBRS CPE base station to service the one or more subscriber devices located at the customer premises served by the CBRS CPE base station. Operation proceeds from step 2044 to step 2046.

In step 2046, the CBRS CPE base station determines whether additional spectrum between the CBRS tower base stations and the CBRS CPE base station is required to serve the one or more subscriber devices located at the customer premises served by the CBRS CPE base station. Decision Step 2046 includes sub-steps 2048 and 2050. When the determination is yes additional spectrum is required, operation proceeds from decision sub-step 2048 of step 2046 to step 2052. When the determination is that no additional spectrum is required, operation proceeds from decision sub-step 2050 of step 2046 to step 2062.

In step 2052, the CBRS CPE base station determines an additional amount of spectrum between the auxiliary CBRS tower base stations and the CBRS CPE base station that is required for the CBRS CPE base station to have sufficient RF link capacity to serve the one or more subscriber devices, e.g., CBRS subscriber devices, located at the customer premises served by the CBRS CPE base station. Operation proceeds from step 2052 to step 2054.

In step 2054, the CBRS CPE base station reserves the additional amount of spectrum from one or more of the auxiliary CBRS tower base stations based on the auxiliary CBRS tower base stations' available spectrum and/or determined RSRP strength level. In one embodiment, the CBRS CPE base station requests or polls each of the auxiliary CBRS tower base stations to determine the amount of spectrum that each CBRS tower base station has available. The polling or requests are performed in accordance with how the auxiliary CBRS tower base stations were ranked based on the strength of the measured/determined RSRP power level starting with the strongest and ending with the weakest. The CBRS CPE base station reserving the additional amount of spectrum with the auxiliary CBRS tower base station having the strongest RSRP power level and the full amount of additional spectrum needed. In some embodiments, upon the identification of the auxiliary CBRS tower base station with the strongest RSRP power level and an amount of spectrum equal to or exceeding the amount of additional spectrum needed, the CBRS tower base station reserves the additional spectrum needed and ceases its polling operations of the other CBRS CPE tower base stations. In some embodiments, when no single auxiliary CBRS tower base station has the full amount of additional spectrum available, the CBRS CPE tower base station, reserves the available spectrum from a plurality of auxiliary CBRS tower base stations. In some such embodiments, the CBRS CPE base station reserves the available spectrum from each of the polled auxiliary CBRS tower base stations in the order they are polled until the additional amount of spectrum needed has been reserved. As the auxiliary CBRS tower base station are polled from strongest RSRP power level to weakest, the result is that available spectrum is reserved from the strongest RSRP power level auxiliary CBRS tower base stations by ranking. In another embodiment, the CBRS CPE tower base station reserves the available spectrum from auxiliary CBRS tower base stations so that the least number of auxiliary CBRS tower base stations need to be utilized thereby reducing the overhead of communicating with more than the minimum number of auxiliary CBRS tower base stations necessary. In such an example while the 1st auxiliary CBRS tower base station may have the strongest RSRP power level of the auxiliary CBRS tower base stations, the CBRS CPE base station may choose the second weakest and the weakest RSRP power level auxiliary CBRS tower base stations because the choice results in the use of only two auxiliary tower base stations when the use of the strongest RSRP level auxiliary CBRS tower base station would result in more than two auxiliary tower base stations to reserve the amount of additional spectrum needed. In some embodiments, instead of requesting or polling the auxiliary CBRS tower base stations provide the amount of spectrum they have available, the auxiliary CBRS tower base stations periodically post the amount of spectrum they have available. In some such embodiments, the CBRS CPE base station can still request from the auxiliary CBRS tower base stations their spectrum availability. In some embodiments, the CBRS CPE base station can also request whether its primary CBRS tower base station has additional spectrum available beyond what it has already allocated to the CBRS CPE base station. In such cases, the CBRS CPE base station makes the request to the primary CBRS tower base station and reserves whatever additional spectrum is available before performing step 2046. Operation proceeds from step 2054 to step 2056.

In step 2056, the CBRS CPE base station establishes temporary connections with each of the one or more auxiliary CBRS tower base stations with which addition spectrum was reserved. Operation proceeds from step 2056 to step 2058.

In step 2058, the CBRS CPE base station utilizes the reserved spectrum of each of the established wireless connections to the one or more auxiliary CBRS tower base stations to provide services to the one or more subscriber devices the CBRS CPE base station is servicing. Operation proceeds from step 2058 via connection node D 2060 to step 2040 shown on FIG. 2B where the method continues with the CBRS CPE base station monitoring for a change in RF link capacity required to serve the one or more subscriber devices located at the customer premises served by the CBRS CPE base station.

Returning to step 2062 and the situation in which a determination that additional spectrum is not required, the CBRS CPE base station determines what if any of the reserved auxiliary CBRS tower base station spectrum is no longer required by the CBRS CPE base station to serve the one or more subscriber devices located at the customer premises being serviced by the CBRS CPE base station. Operation proceeds from step 2062 to step 2064.

In step 2064, the CBRS CPE base station releases the reserved auxiliary tower base station spectrum that it determined in step 2062 it no longer requires, e.g., to serve the subscriber devices located at the customer premises it is serving. When all of the reserved spectrum with a particular auxiliary CBRS tower base station has been released by the CBRS CPE base station, the temporary connection between the CBRS CPE base station and that particular auxiliary CBRS tower base station is torn down or terminated. The particular auxiliary CBRS tower base station remains available to the CBRS CPE base station should the situation change and additional spectrum once again be required. Operation proceeds from step 2064 via connection node D 2060 to step 2040 shown on FIG. 2B wherein the steps of the method continue as previously described.

Figure 15:
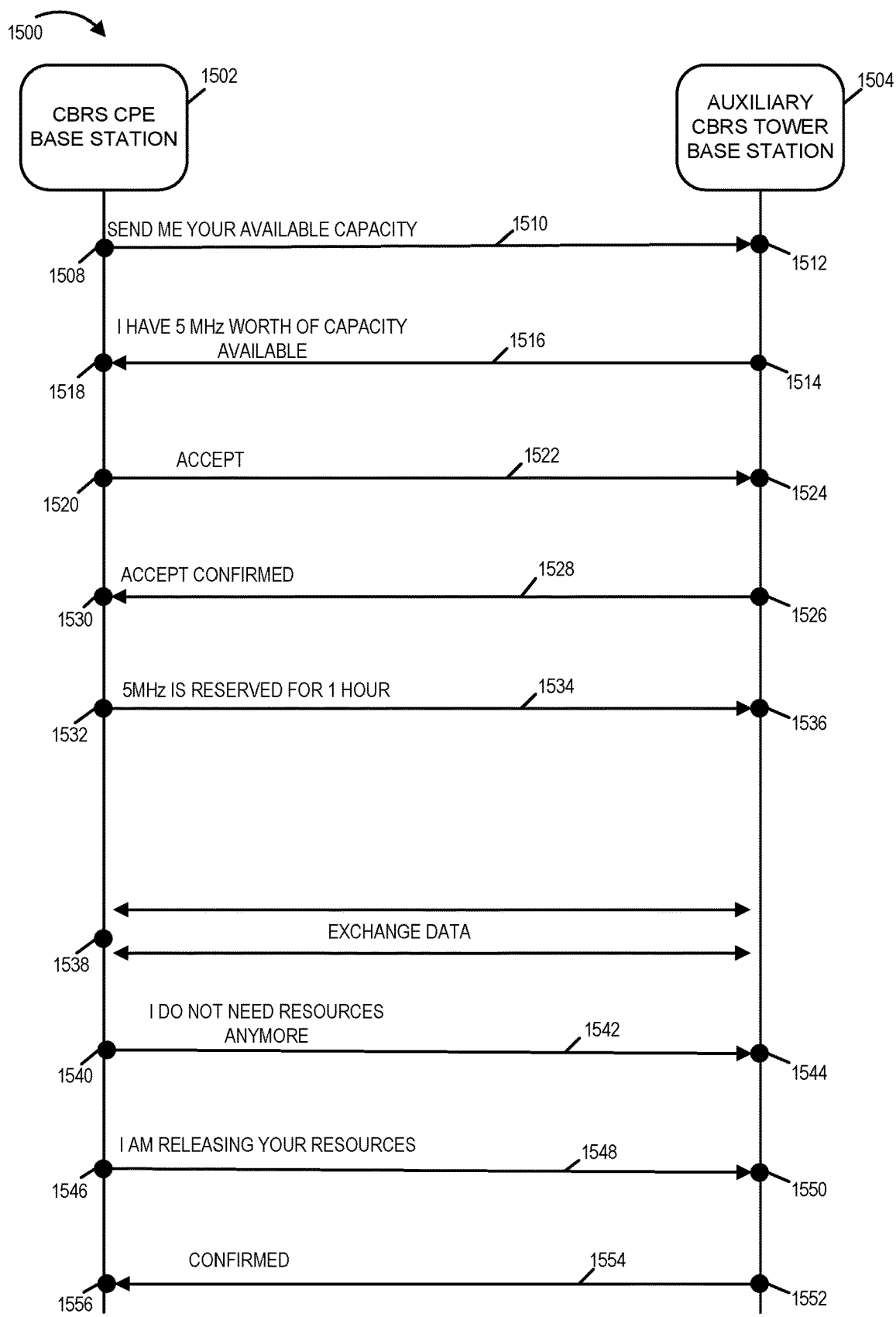
FIG. 15 illustrates exemplary signaling between a CBRS CPE base station and an auxiliary CBRS base station in connection with reserving available spectrum.

FIG. 15 illustrates an exemplary method/signaling diagram 1500 showing exemplary signaling between a CBRS CPE base station 1502 and one of its auxiliary CBRS tower base station 1504 to request and reserve spectrum. The CBRS CPE base station 1502 in some embodiments is the CBRS CPE base station 1 112 of system 100 and the auxiliary CBRS tower base station 1504 in such embodiments is one of the auxiliary CBRS tower base stations 2 104, 3 106, ..., N 108.

The method begins in step 1508 wherein after determining that additional spectrum is required beyond the spectrum made available by the primary CBRS tower base station, the CBRS CPE base station 1502 generates and sends spectrum availability request message 1510 to auxiliary CBRS tower base station 1504. Operation proceeds from step 1508 to step 1512.

In step 1512, the auxiliary CBRS tower base station 1504 receives and processes the spectrum availability request message 1510. Operation proceeds from step 1512 to step 1514.

In step 1514, the auxiliary CBRS tower base station 1504 determines the amount of available spectrum it has available which in this example is 5 MHz and generates and sends spectrum availability response message 1516 to CBRS CPE base station 1502 in response to request message 1510. The response message 1516 includes the information that the auxiliary CBRS tower base station has 5 MHz worth of capacity available. Operation proceeds from step 1514 to step 1518.

In step 1518, the CBRS CPE base station 1502 receives and processes the response message 1516. Operation proceeds from step 1518 to step 1520.

In step 1520, the CBRS CPE base station 1502 determines that it wants to reserve the 5 MHz of available spectrum and generates and sends to auxiliary CBRS tower base station 1504 message 1522 which indicates an acceptance and/or request to reserve the available 5 MHz worth of spectrum. Operation proceeds from step 1520 to step 1524.

In step 1524, the auxiliary CBRS tower base station 1504 receives and processes the message 1522. Operation proceeds from step 1524 to step 1526.

In step 1526, the auxiliary CBRS tower base station 1504 generates and sends message 1528 to CBRS CPE base station 1502 which confirms the receipt of message 1522 confirming the acceptance and/or request to reserve the 5 MHz of available spectrum. Operation proceeds from step 1526 to step 1530.

In step 1530, the CBRS CPE base station 1502 receives and processes the response message 1528 which acknowledges and confirms the acceptance of the reservation of the 5 MHz spectrum. Operation proceeds from step 1530 to step 1532.

In step 1532, the CBRS CPE base station 1502 makes a determination of how long it will reserve the 5 MHz available spectrum for and generates and sends message 1534 to auxiliary CBRS tower base station 1504 with the message 1534 indicating that it is reserving the 5 MHz spectrum of the auxiliary CBRS tower base 1504 for 1 hour. Operation proceeds from step 1532 to step 1536.

In step 1536, the auxiliary CBRS tower base station 1504 receives and processes the message 1534. Operation proceeds from step 1536 to step 1538.

In step 1538, the CBRS CPE base station 1502 utilizes the reserved 5 MHz of spectrum to provide services to the user equipment devices it is servicing, e.g., by receiving and/or transmitting or exchanging data over the communications link established with auxiliary CBRS tower base station 1504. Operation proceeds from step 1538 to step 1540.

In step 1540, the CBRS CPE base station 1502 determines that it no longer needs the reserved spectrum even though the 1 hour for which it was reserved has not yet expired and generates and sends message 1542 to auxiliary CBRS tower base station 1504. Operation proceeds from step 1540 to step 1544.

In step 1544, the auxiliary CBRS tower base station 1504 receives and processes the message 1542.

In step 1546, the CBRS CPE base station 1502 generates and sends message 1548 to auxiliary CBRS tower base station 1504 releasing the 5 MHz of spectrum which had been reserved by the auxiliary CBRS tower base station 1504 for use by CBRS CPE base station 1502. Operation proceeds from step 1546 to step 1550.

In step 1550, the auxiliary CBRS tower base station 1504 receives and processes the message 1548 which indicates that the 5 MHz of reserved spectrum has been released. Operation proceeds from step 1550 to step 1552.

In step 1552, the auxiliary tower base station 1504 generates and sends an acknowledgement or confirmation message 1554 to CBRS CPE base station 1502 confirming or acknowledging that the 5 MHz of spectrum previously reserved for CBRS CPE base station 1502 has been released, i.e., is available for use by other devices and for other purposes. Operation proceeds from step 1552 to step 1556.

In step 1556, the CBRS CPE base station 1502 receives and processes the message 1554.

Figure 16:
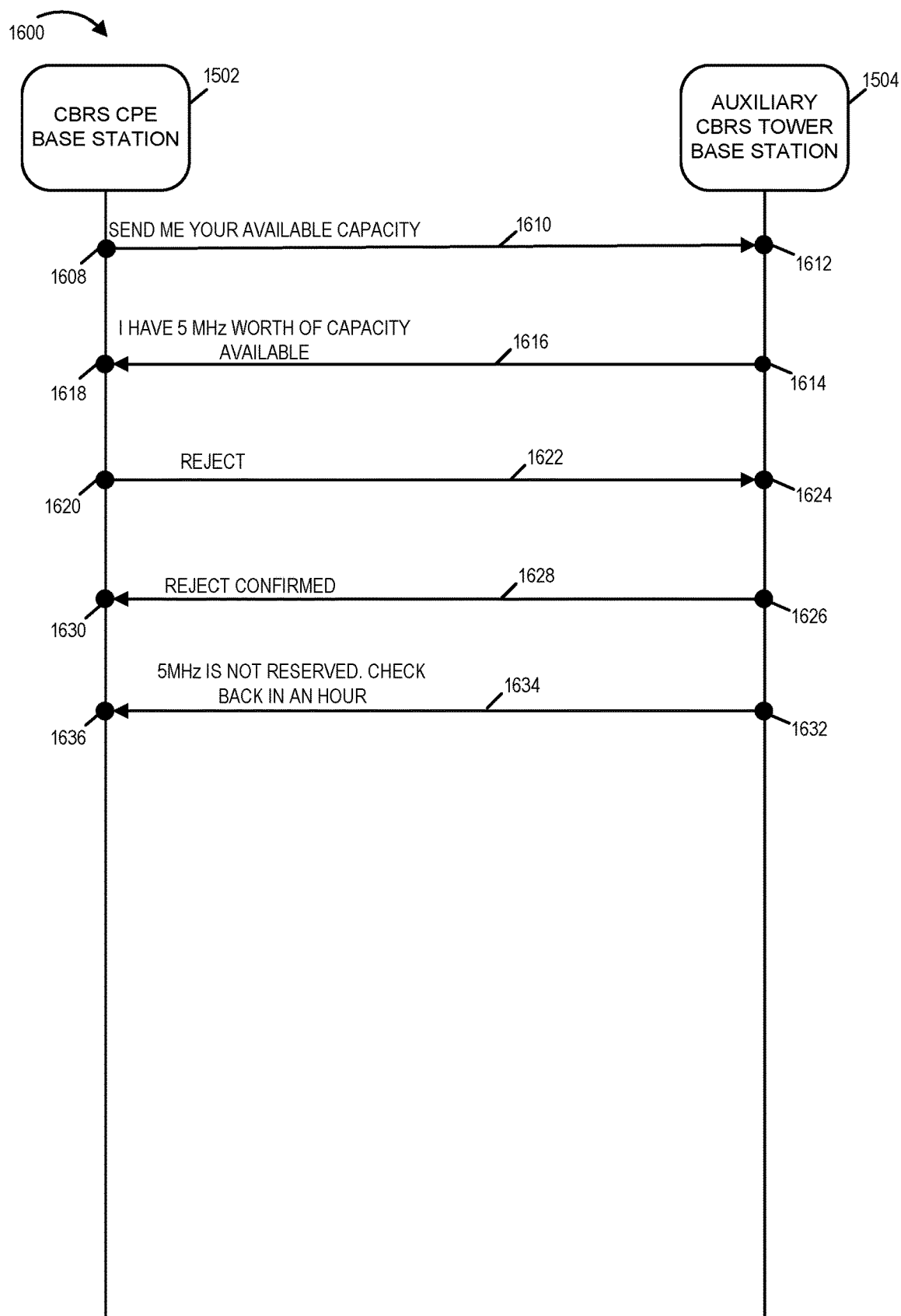
FIG. 16 illustrates exemplary signaling between a CBRS CPE base station and an auxiliary CBRS base station showing the rejection of available spectrum by the CBRS CPE base station.

FIG. 16 illustrates an exemplary method/signaling diagram 1600 showing exemplary signaling between a CBRS CPE base station 1502 and one of its auxiliary CBRS tower base station 1504 in which the CBRS CPE base station 1502 requests available spectrum capacity and then rejects the available spectrum of the auxiliary CBRS tower base station 1504.

The CBRS CPE base station 1502 in some embodiments is the CBRS CPE base station 1 112 of system 100 and the auxiliary CBRS tower base station 1504 in such embodiments is one of the auxiliary CBRS tower base stations 2 104, 3 106, ..., N 108.

The method begins in step 1608 wherein after determining that additional spectrum is required beyond the spectrum made available by the primary CBRS tower base station, the CBRS CPE base station 1502 generates and sends spectrum availability request message 1610 to auxiliary CBRS tower base station 1504. Operation proceeds from step 1608 to step 1612.

In step 1612, the auxiliary CBRS tower base station 1504 receives and processes the spectrum availability request message 1610. Operation proceeds from step 1612 to step 1614.

In step 1614, the auxiliary CBRS tower base station 1504 determines the amount of available spectrum it has available which in this example is 5 MHz and generates and sends spectrum availability response message 1616 to CBRS CPE base station 1502 in response to request message 1610. The response message 1616 includes the information that the auxiliary CBRS tower base station 1504 has 5 MHz worth of capacity available. Operation proceeds from step 1614 to step 1618.

In step 1618, the CBRS CPE base station 1502 receives and processes the response message 1616. Operation proceeds from step 1618 to step 1620.

In step 1620, the CBRS CPE base station 1502 determines that it does not want to reserve the 5 MHz of available spectrum and generates and sends to auxiliary CBRS tower base station 1504 message 1622 which indicates a rejection of the available 5 MHz worth of spectrum. One reason for rejecting the available spectrum is that there is an insufficient amount of spectrum available at the auxiliary CBRS tower base station while another auxiliary CBRS tower base station has reported that it has a sufficient amount of spectrum available to meet the additional spectrum requirements of the CBRS CPE base station. Operation proceeds from step 1620 to step 1624.

In step 1624, the auxiliary CBRS tower base station 1504 receives and processes the rejection message 1622 indicating that the CBRS CPE base station 1502 does not want to reserve the 5 MHz of spectrum available at the auxiliary CBRS tower base station 1504. Operation proceeds from step 1624 to step 1626.

In step 1626, the auxiliary CBRS tower base station 1504 generates and sends message 1628 to CBRS CPE base station 1502 indicating confirmation of the receipt of rejection message 1622. Operation proceeds from step 1626 to steps 1630 and 1632. In step 1630, the CBRS CPE base station 1502 receives and processes the confirmation message 1628.

In step 1632, the auxiliary CBRS tower base station 1504 generates and sends message 1634 to CBRS CPE base station 1502 indicating that the 5 MHz of available spectrum has not been reserved and provides a time when the CBRS CPE base station 1502 can check back for available spectrum which in this example is in an hour. Operation proceeds from step 1632 to step 1636.

In step 1636, the CBRS CPE base station 1502 receives and processes the message 1634 indicating that the 5 MHz of available spectrum at the auxiliary CBRS tower base 1504 has not been reserved and when the CBRS CPE base station 1502 should check back for available spectrum.

Figure 17:
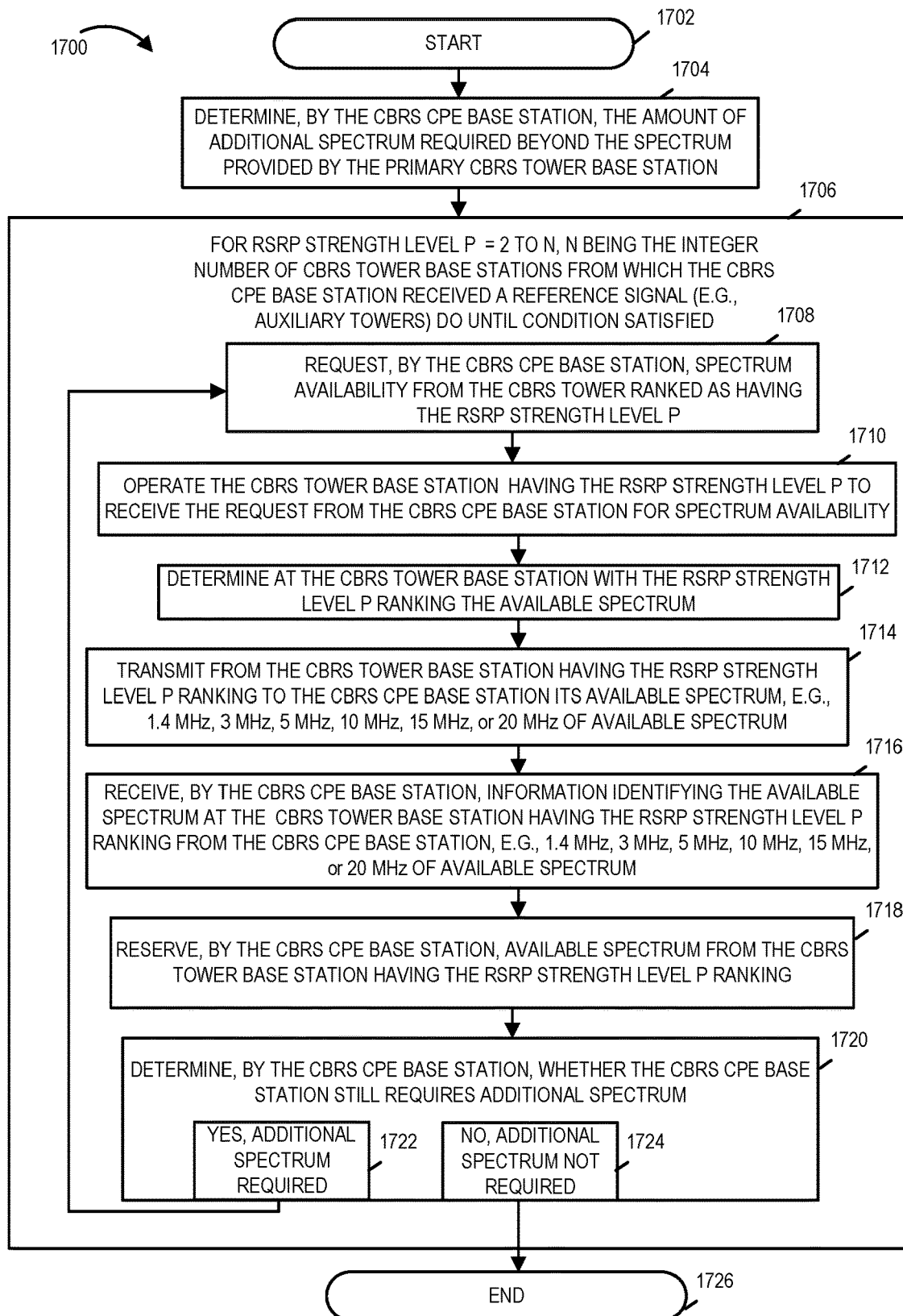
FIG. 17 illustrates an exemplary method of reserving spectrum from auxiliary CBRS tower base stations in accordance with an embodiment of the present.

FIG. 17 illustrates an exemplary method 1700 of reserving spectrum from auxiliary CBRS tower base stations in accordance with an embodiment of the present invention.

The method begins in start step 1702. Operation proceeds from start step 1702 to step 1704.

In step 1704, the CBRS CPE base station determines the amount of additional spectrum required beyond the amount of spectrum provided by the primary CBRS tower base station. In some embodiments, step 1704 is optional as the amount of additional spectrum required has already been determined and is made available for use in the method 1700. Operation proceeds from step 1704 to step 1706.

In step 1706 for Reference Signal Received Power Strength Level P=2 to N, N being the integer number of CBRS Tower Base Stations from which the CBRS CPE base station received a reference signal (e.g., auxiliary CBRS tower base stations) DO sub-steps 1708, 1710, 1712, 1714, 1716, 1718, 1720 until the condition is satisfied, the condition being that no additional spectrum is required to be reserved. The RSRP strength level is the ranking of the RSRP level by the CBRS CPE base station. For example, when P=2 a review of the FIG. 11 auxiliary CBRS tower base station rankings indicate that the CBRS tower base station 2 104 is ranked 2 and would be the auxiliary CBRS tower base station referenced in the first loop of the DO until routine in step 1706.

In sub-step 1708, the CBRS CPE base station requests spectrum availability from the CBRS tower ranked as having the RSRP level P. Operation proceeds from sub-step 1708 to sub-step 1710.

In sub-step 1710, the CBRS tower base station having the RSRP strength level P ranking receives the request from the CBRS CPE base station. Operation proceeds from step 1710 to step 1712.

In step 1712, the CBRS tower base station having the RSRP strength level P ranking determines its available spectrum. Operation proceeds from step 1712 to step 1714.

In step 1714, transmit from the CBRS tower base station having the RSRP strength level P ranking to the CBRS CPE base station its available spectrum in MHz, e.g., 1.4 MHz, 3 MHz, 5 MHz, 10 MHz, or 20 MHz of available spectrum. Operation proceeds from step 1714 to step 1716.

In step 1716, the CBRS CPE base station receives from the CBRS tower base station having the RSRP strength level P ranking information identifying the available spectrum at the CBRS tower base station having the RSRP strength level P ranking. Operation proceeds from step 1716 to step 1718.

In step 1718, the CBRS CPE base station reserves the available spectrum from the CBRS tower base station having the RSRP strength level P ranking. Operation proceeds from step 1718 to step 1720.

In step 1720, the CBRS CPE base station determines whether the CBRS CPE base station still requires additional spectrum. When the determination is yes in sub-step 1722 operation proceeds from step 1720 to step 1708 with beginning of the next loop and P having the value of 3.

When in step 1720, the determination is that no addition spectrum is required because the additional spectrum reserved now meets or exceeds the spectrum required operation proceeds from sub-step 1724 to end step 1726 wherein the method 1700 ends.

Additionally, operation will proceed from step 1706 to step 1726 when the DO loop completes for P=N even if additional spectrum is determined to be required as there is no additional spectrum available from the auxiliary CBRS tower base stations.

Table 1300 in FIG. 13 illustrates an example of spectrum reservation when the spectrum required by the CPE CBRS base station is 45 MHz and the main wireless link connection with the primary CBRS tower base station provides 20 MHz, the auxiliary CBRS tower base station 2 104 provides 20 MHz on a temporary connection, and the auxiliary CBRS tower base station 3 106 provides 10 MHz on a temporary connection so that the CPE CBRS base station has 50 MHz of spectrum available which exceeds the 45 MHz it requires. In some embodiments, the CBRS CPE base station will only reserve a portion of the available spectrum of the auxiliary CBRS tower base station reported as available such as for example 5 MHz instead of the 10 MHz reserved and provided by CBRS tower base station 3 106 shown in FIG. 13. In FIG. 13 column 1110' illustrates the connection status and spectrum allocated or reserved by the CBRS tower base stations for the CBRS CPE base station.

Figure 18:
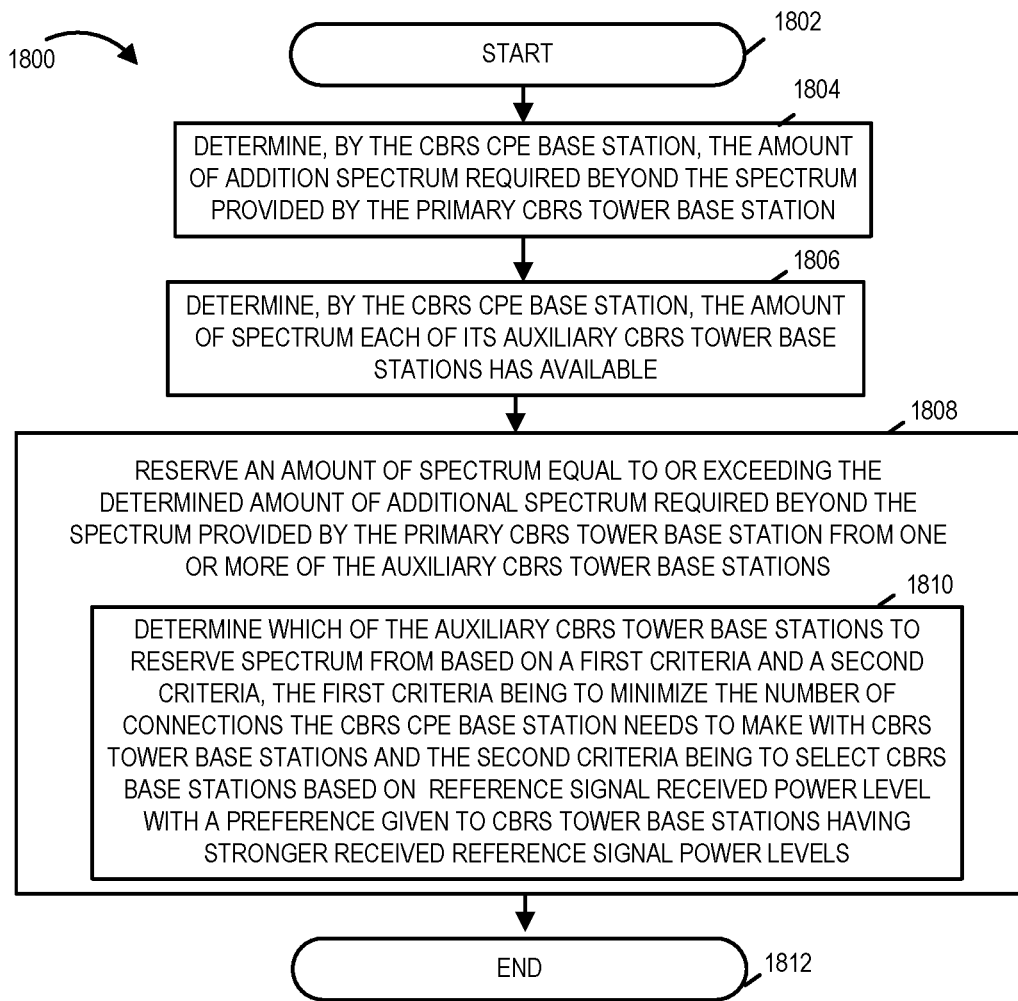
FIG. 18 illustrates another exemplary method of reserving spectrum from auxiliary CBRS tower base stations in accordance with an embodiment of the present.

FIG. 18 illustrates an exemplary method 1800 of reserving spectrum from auxiliary CBRS tower base stations in accordance with an embodiment of the present invention.

The method begins in start step 1802. Operation proceeds from start step 1802 to step 1804.

In step 1804, the CBRS CPE base station determines the amount of additional spectrum required beyond the amount of spectrum provided by the primary CBRS tower base station. In some embodiments, step 1804 is optional as the amount of additional spectrum required has already been determined and is made available for use in the method 1800. Operation proceeds from step 1804 to step 1806.

In step 1806, the CBRS CPE base station determines the amount of spectrum each of its auxiliary CBRS tower base stations has available. Operation proceeds from step 1806 to step 1808.

In step 1808, the CBRS CPE base station reserves an amount of spectrum equal to or exceeding the determined amount of additional spectrum required beyond the spectrum provided by the primary CBRS tower base station from one or more of the auxiliary CBRS tower base stations. In some embodiments, step 1808 includes sub-step 1810.

In sub-step 1810, the CBRS CPE base station determines which of the auxiliary CBRS tower base stations to reserve spectrum from based on a first criteria and a second criteria. The first criteria being to minimize the number of connections the CBRS CPE base station needs to make with CBRS tower base stations. The second criteria being to select CBRS base stations based on reference signal received power level with a preference given to CBRS tower base stations having stronger received reference signal power levels. The first criteria having priority over the second criteria.

Table 1400 of FIG. 14 illustrates an example of the resulting application of method 1800. The table 1400 is similar to the table 1300 with the addition of column 1109 which includes the available spectrum for the corresponding CBRS tower base station and column 1110" showing a different CPE connection status and allocated spectrum. In the example shown in FIG. 14, the CBRS CPE base station requires 50 MHz of spectrum. The primary CBRS tower base station 1 has allocated 20 MHz of spectrum. The auxiliary CBRS tower base station 2 has 10 MHz of spectrum available, the auxiliary CBRS tower base station 3 has 10 MHz of spectrum available and the auxiliary CBRS tower base station 4 has 20 MHz of spectrum available. The amount of additional spectrum needed beyond the 20 MHz of spectrum provided by the primary CBRS tower base station 1 is 30 MHz. The CBRS CPE base station determines that minimum number of connections to CBRS tower base stations that will provided the needed spectrum is three. Two different combinations will provide the needed spectrum. The first combination includes the primary CBRS tower base station 1 20 MHz, the auxiliary CBRS tower base 2 10 MHz, and the auxiliary CBRS tower base station 4 20 MHz. The second combination includes the primary CBRS tower base station 1 20 MHz, the auxiliary CBRS tower base station 3 10 MHz, and the auxiliary CBRS tower base station 4 20 MHz. The CBRS CPE tower base station determines to use the first combination as the RSRP power level of auxiliary CBRS tower base station 2 is −115 dBm which is stronger than the RSRP power level of auxiliary CBRS tower base station 3 which is −117 dBm. Operation proceeds from step 1808 to step 1812. In step 1812, the method 1800 ends.

In various embodiments of the present invention, the CBRS CPE base station estimates and reserves spectrum from auxiliary CBRS tower base stations so that it has sufficient spectrum to support all devices located at the customer premises it is serving at all times.

In some embodiments, the CBRS tower base stations can only allocate fixed amounts of resources to a CBRS CPE base station, e.g., 1.4 MHz, 3 MHz, 5 MHz, 10M Hz or 20 M Hz.

In some embodiments, the CBRS CPE base station utilizes the wireless communications link connection with the primary CBRS tower base station for control signaling and the CBRS tower base station reserves an amount of spectrum for the exchange of control signals between the primary CBRS tower base station and the CBRS CPE base station.

In some embodiments, the information in the tables illustrated in FIGS. 11, 12, 13, and 14 are stored in the memory of the CBRS CPE base station.

Various exemplary embodiments illustrating different features of the present invention will now be discussed.

List of a Set of Exemplary Numbered Method Embodiments

Method Embodiment 1: A method of operating a Citizens Broadband Radio Service Customer Premise Equipment (CBRS CPE) base station in a CBRS network, the method comprising: receiving, by the CBRS CPE base station, over the air from each of a plurality of Citizens Broadband Radio Service Fixed Wireless Access (CBRS FWA) tower base stations a reference signal; selecting, based on the strength of each of the received reference signals, a primary CBRS FWA tower base station from the plurality of CBRS FWA tower base stations; establishing, by the CBRS CPE base station, a wireless communications link connection with the CBRS FWA tower base station selected as the primary CBRS FWA tower base station; reserving, by the CBRS CPE base station, an amount of spectrum for communicating with one or more auxiliary CBRS FWA tower base stations.

Method Embodiment 2: The method of method embodiment 1, wherein the CBRS CPE base station is located at a customer premises which does not include a wired or optical broadband service connection.

Method Embodiment 3: The method of method embodiment 1, wherein user equipment devices located at the customer premises at which the CBRS CPE base station is located are only provided broadband services through wireless communications, said wireless communications including CBRS network wireless communications.

Method Embodiment 4: The method of method embodiment 1, wherein the CBRS CPE base station is located at a customer premises which has no landline connection.

Method Embodiment 5: The method of method embodiment 1, wherein the CBRS CPE base station is located at a customer premises which has no landline connection over which broadband services can be provided.

Method Embodiment 6: The method of method embodiment 1, wherein one or more of the plurality of CBRS FWA tower base stations are simultaneously operated as primary CBRS CPE base stations and auxiliary CBRS CPE base stations with regard to different additional CBRS CPE base stations located within their coverage area.

Method Embodiment 7: The method of method embodiment 1, wherein the plurality of CBRS FWA tower base stations have overlapping coverage areas.

Method Embodiment 8: The method of method embodiment 1, wherein selecting, based on the strength of each of the received reference signals a primary CBRS FWA tower base station from the plurality of CBRS FWA tower stations includes: (i) determining, by the CBRS CPE base station, a Reference Signal Received Power (RSRP) level value for each reference signal received from the plurality of CBRS FWA tower base stations; and (ii) selecting, by the CBRS CPE base station, the CBRS FWA base station having the strongest RSRP level value as the primary CBRS FWA tower base station.

Method Embodiment 9: The method of method embodiment 8, wherein one or more of the CBRS FWA base stations which were not selected as the primary CBRS FWA tower base station are designated by the CBRS CPE base station as auxiliary CBRS FWA tower base stations.

Method Embodiment 10: The method of method embodiment 1, wherein the CBRS CPE base station provides broadband services to one or more user equipment devices located at a customer premises.

Method Embodiment 11: The method of method embodiment 10, wherein at least a first portion of CBRS CPE base station is located within a building at the customer premises, said CPE CBRS base station including a second portion, said second portion including an antenna or antenna array mounted at an elevated position at the customers premises, said antenna or antenna array being used to wirelessly communicate with said primary CBRS FWA base station and said one or more auxiliary CBRS FWA base stations.

Method Embodiment 12: The method of method embodiment 10, wherein said antenna or said antenna array is mounted on the roof of the building at the customer premises or on a pole outside the building at the customer premises.

Method Embodiment 13: The method of method embodiment 11, wherein said CBRS CPE base station includes a plurality of communications interfaces, said plurality of communication interfaces including a first wireless communications interface for communicating with CBRS FWA base stations and a second wireless communications interface for communicating with user equipment devices.

Method Embodiment 14: The method of method embodiment 10 further comprising: prior to reserving, by the CBRS CPE base station, spectrum for communicating with one or more auxiliary CBRS FWA tower base stations, determining, by the CBRS CPE base station, whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises; and when said amount of spectrum allocated by the primary CBRS FWA base station to the CBRS CPE base station for device to device communications between the CBRS CPE base station and the CBRS FWA base station is not sufficient for providing the broadband services to the one or more user equipment devices located at the customer premises determining an amount of additional spectrum required for providing the broadband services to the one or more user equipment devices located at the customer premises.

Method Embodiment 15: The method of method embodiment 14, wherein the amount of spectrum reserved, by the CBRS CPE base station, for communicating with one or more auxiliary CBRS FWA tower base stations is an amount which equals or exceeds the amount of additional spectrum required for providing the broadband services to the one or more user equipment devices located at the customer premises.

Method Embodiment 16: The method of method embodiment 14, wherein said determining, by the CBRS CPE base station, whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises includes the CBRS CPE base station measuring a load that is caused by serving the user equipment devices located at the customers premises and/or within the coverage area of the CBRS CPE base station.

Method Embodiment 17: The method of method embodiment 14 further comprising: establishing, by the CBRS CPE base station, temporary wireless communications link connections with the one or more auxiliary CBRS FWA tower base stations; and utilizing said reserved spectrum for providing said broadband services to the one or more user equipment devices located at the customer premises.

Method Embodiment 18: The method of method embodiment 17 further comprising: determining, by the CBRS CPE base station, when said reserved spectrum is no longer needed to support the broadband services being provided by the CBRS CPE base station to the user equipment devices located at the customer premises; releasing, by the CBRS CPE base station, reserved spectrum determined to no longer be needed; terminating, by the CBRS CPE base station, the temporary wireless communications link connections with the one or more auxiliary CBRS FWA tower base stations when said reserved spectrum is released.

Method Embodiment 19: The method of method embodiment 1, wherein reserving, by the CBRS CPE base station, an amount of spectrum for communicating with one or more auxiliary CBRS FWA tower base stations includes: requesting from one or more of the one or more auxiliary CBRS FWA tower base stations what spectrum each CBRS FWA tower base station has available.

Method Embodiment 20: The method of method embodiment 19, further comprising: determining which of the one or more auxiliary CBRS FWA tower base stations to reserve available spectrum from based on: (i) the amount of additional spectrum to be reserved, (ii) an amount of spectrum reported as being available at the auxiliary CBRS FWA tower base station, and (iii) the strength of the reference signal received from the auxiliary CBRS FWA tower base station.

Method Embodiment 21: The method of method embodiment 19 further comprising: monitoring, by the CBRS CPE base station, for a change in a radio frequency link capacity required to serve the one or more user equipment devices located at the customer premises; and upon detecting a change in the radio frequency link capacity required to serve the one or more user equipment devices located at the customer premises; determining if an amount of additional spectrum in excess of the amount of spectrum allocated by the primary CBRS tower base station is required; and when an amount of additional spectrum in excess of the amount of spectrum allocated by the primary CBRS tower base station is determined to be required: (i) requesting, by the CBRS CPE base station, one or more of the auxiliary CBRS FWA tower base stations provide information indicating an amount of spectrum the corresponding auxiliary CBRS FWA tower base station has available; (ii) reserving available spectrum from one or more of the one or more auxiliary CBRS FWA tower base stations based on the amount of additional spectrum required, the amount of spectrum available, and the strength of the RSRP level value of the reference signal received from the one or more auxiliary CBRS FWA tower base stations.

Method Embodiment 22: The method of method embodiment 1 further comprising: prior to reserving, by the CBRS CPE base station, an amount of spectrum for communicating with the one or more auxiliary CBRS FWA tower base stations, ranking, by the CBRS CPE base station, the plurality of CBRS FWA base stations from strongest RSRP level value to weakest RSRP level value; requesting, by the CBRS CPE base station, spectrum availability from the one or more auxiliary CBRS FWA base stations; and selecting said one or more CBRS FWA base stations from which to reserve an amount of spectrum based on: (i) amount of spectrum to be reserved and (ii) auxiliary CBRS FWA base station's spectrum availability and RSRP ranking.

List of a Set of Exemplary Numbered Apparatus Embodiments

Apparatus Embodiment 1: A Citizens Broadband Radio Service Customer Premise Equipment (CBRS CPE) base station comprising: memory; a first wireless input/output interface that communicates with a plurality of Citizens Broadband Radio Service Fixed Wireless Access (CBRS FWA) tower base stations; a second wireless input/output interface that communicates with user equipment devices; a processor that controls the CBRS CPE base station to: receive, by the first wireless input/output interface, over the air from each of a plurality of Citizens Broadband Radio Service Fixed Wireless Access (CBRS FWA) tower base stations a reference signal; select, based on the strength of each of the received reference signals, a primary CBRS FWA tower base station from the plurality of CBRS FWA tower base stations; establish, by the CBRS CPE base station, a wireless communications link connection with the CBRS FWA tower base station selected as the primary CBRS FWA tower base station; reserve, by the CBRS CPE base station, an amount of spectrum for communicating with one or more auxiliary CBRS FWA tower base stations.

Apparatus Embodiment 2: The CBRS CPE base station of apparatus embodiment 1, wherein the CBRS CPE base station is located at a customer premises which does not include a wired or optical broadband service connection.

Apparatus Embodiment 3: The CBRS CPE base station of apparatus embodiment 1, wherein user equipment devices located at the customer premises at which the CBRS CPE base station is located are only provided broadband services through wireless communications, said wireless communications including CBRS network wireless communications.

Apparatus Embodiment 4: Th CBRS CPE base station of apparatus embodiment 1, wherein the CBRS CPE base station is located at a customer premises which has no landline connection.

Apparatus Embodiment 5: The CBRS CPE base station of apparatus embodiment 1, wherein the CBRS CPE base station is located at a customer premises which has no landline connection over which broadband services can be provided.

Apparatus Embodiment 6: The CBRS CPE base station of apparatus embodiment 1, wherein one or more of the plurality of CBRS FWA tower base stations are simultaneously operated as primary CBRS CPE base stations and auxiliary CBRS CPE base stations with regard to different additional CBRS CPE base stations located within their coverage area.

Apparatus Embodiment 7: The CBRS CPE base station of apparatus embodiment 1, wherein the plurality of CBRS FWA tower base stations have overlapping coverage areas.

Apparatus Embodiment 8: The CBRS CPE base station of apparatus embodiment 1, wherein said selection, based on the strength of each of the received reference signals of the primary CBRS FWA tower base station from the plurality of CBRS FWA tower base stations includes: (i) determining, by the CBRS CPE base station, a Reference Signal Received Power (RSRP) level value for each reference signal received from the plurality of CBRS FWA tower base stations; and (ii) selecting, by the CBRS CPE base station, the CBRS FWA base station having the strongest RSRP level value as the primary CBRS FWA tower base station.

Apparatus Embodiment 9: The CBRS CPE base station of apparatus embodiment 8, wherein one or more of the CBRS FWA base stations which were not selected as the primary CBRS FWA tower base station are designated by the CBRS CPE base station as auxiliary CBRS FWA tower base stations.

Apparatus Embodiment 10: The CBRS CPE base station of apparatus embodiment 1, wherein the processor further controls the CBRS CPE base station to provide broadband services to one or more user equipment devices located at a customer premises.

Apparatus Embodiment 11: The CBRS CPE base station of apparatus embodiment 10 further comprising: a first portion and a second portion; said first portion including said processor and said memory, said first portion of the CBRS CPE base station being located within a building at the customer premises, said second portion of the CBRS CPE base station including an antenna or antenna array mounted at an elevated position at the customers premises, said antenna or antenna array being used to wirelessly communicate with said primary CBRS FWA base station and said one or more auxiliary CBRS FWA base stations, said second portion being coupled to said first portion.

Apparatus Embodiment 12: The CBRS CPE base station of apparatus embodiment 10, wherein said antenna or said antenna array is mounted on the roof of the building at the customer premises or on a pole outside the building at the customer premises.

Apparatus Embodiment 13: The CBRS CPE base station of apparatus embodiment 11 further comprising: a Wi-Fi communications interface for communicating with Wi-Fi user equipment devices; and an Ethernet communications interface for communicating with user equipment devices over a local area network.

Apparatus Embodiment 14: The CBRS CPE base station of apparatus embodiment 10 wherein said processor further controls the CBRS CPE base station to: determine, by the CBRS CPE base station, whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises prior to reserving, by the CBRS CPE base station, spectrum for communicating with one or more auxiliary CBRS FWA tower base stations; and when said amount of spectrum allocated by the primary CBRS FWA base station to the CBRS CPE base station for device to device communications between the CBRS CPE base station and the CBRS FWA base station is not sufficient for providing the broadband services to the one or more user equipment devices located at the customer premises determining an amount of additional spectrum required for providing the broadband services to the one or more user equipment devices located at the customer premises.

Apparatus Embodiment 15: The CBRS CPE base station of apparatus embodiment 14, wherein the amount of spectrum reserved, by the CBRS CPE base station, for communicating with one or more auxiliary CBRS FWA tower base stations is an amount which equals or exceeds the amount of additional spectrum required for providing the broadband services to the one or more user equipment devices located at the customer premises.

Apparatus Embodiment 16: The CBRS CPE of apparatus embodiment 14, wherein said determining, by the CBRS CPE base station, whether an amount of spectrum allocated by the primary CBRS FWA base station to the CBRS CPE base station for device to device communications between the CBRS CPE base station and the CBRS FWA base station is sufficient for providing the broadband services to the one or more user equipment devices located at the customer premises includes the CBRS CPE base station measuring a load that is caused by serving the user equipment devices located at the customers premises and/or within the coverage area of the CBRS CPE base station.

Apparatus Embodiment 17: The CBRS CPE base station of apparatus embodiment 14, wherein said processor further controls the CBRS CPE base station to: establish temporary wireless communications link connections with the one or more auxiliary CBRS FWA tower base stations; and utilize said reserved spectrum for providing said broadband services to the one or more user equipment devices located at the customer premises.

Apparatus Embodiment 18: The CBRS CPE base station of apparatus embodiment 17 wherein said processor further controls the CBRS CPE base station to: determine when said reserved spectrum is no longer needed to support the broadband services being provided by the CBRS CPE base station to the user equipment devices located at the customer premises; release reserved spectrum determined to no longer be needed; terminate the temporary wireless communications link connections with the one or more auxiliary CBRS FWA tower base stations when said reserved spectrum is released.

Apparatus Embodiment 19: The CBRS CPE base station of apparatus embodiment 1, wherein said to reserve an amount of spectrum for communicating with one or more auxiliary CBRS FWA tower base stations includes: requesting from one or more of the one or more auxiliary CBRS FWA tower base stations what spectrum each CBRS FWA tower base station has available.

Apparatus Embodiment 20: The CBRS CPE base station of apparatus embodiment 19, wherein said processor further controls the CBRS CPE base station to: determine which of the one or more auxiliary CBRS FWA tower base stations to reserve available spectrum from based on: (i) the amount of additional spectrum to be reserved, (ii) an amount of spectrum reported as being available at the auxiliary CBRS FWA tower base station, and (iii) the strength of the reference signal received from the auxiliary CBRS FWA tower base station.

Apparatus Embodiment 21: The CBRS CPE base station of apparatus embodiment 19 wherein said processor further controls the CBRS CPE base station to: monitor for a change in a radio frequency link capacity required to serve the one or more user equipment devices located at the customer premises; and upon detecting a change in the radio frequency link capacity required to serve the one or more user equipment devices located at the customer premises, determine if an amount of additional spectrum in excess of the amount of spectrum allocated by the primary CBRS tower base station is required; and when an amount of additional spectrum in excess of the amount of spectrum allocated by the primary CBRS tower base station is determined to be required: (i) requesting, by the CBRS CPE base station, one or more of the auxiliary CBRS FWA tower base stations provide information indicating an amount of spectrum the corresponding auxiliary CBRS FWA tower base station has available; (ii) reserving available spectrum from one or more of the one or more auxiliary CBRS FWA tower base stations based on the amount of additional spectrum required, the amount of spectrum available, and the strength of the RSRP level value of the reference signal received from the one or more auxiliary CBRS FWA tower base stations.

Apparatus Embodiment 22: The CBRS CPE base station of apparatus embodiment 1 wherein said processor further controls the CBRS CPE base station to: rank, by the CBRS CPE base station, the plurality of CBRS FWA base stations from strongest RSRP level value to weakest RSRP level value prior to reserving, by the CBRS CPE base station, an amount of spectrum for communicating with the one or more auxiliary CBRS FWA tower base stations; request, by the CBRS CPE base station, spectrum availability from the one or more auxiliary CBRS FWA base stations; and select said one or more CBRS FWA base stations from which to reserve an amount of spectrum based on: (i) amount of spectrum to be reserved and (ii) auxiliary CBRS FWA base station's spectrum availability and RSRP ranking.

List of Exemplary Numbered Computer Readable Medium Embodiments

Computer Readable Medium Embodiment 1: A non-transitory computer readable medium including a first set of computer executable instructions which when executed by a processor of a Citizens Broadband Radio Service Customer Premise Equipment (CBRS CPE) base station cause the CBRS CPE base station to perform the steps of: receiving over the air from each of a plurality of Citizens Broadband Radio Service Fixed Wireless Access (CBRS FWA) tower base stations a reference signal; selecting based on the strength of each of the received reference signals, a primary CBRS FWA tower base station from the plurality of CBRS FWA tower base stations; establishing a wireless communications link connection with the CBRS FWA tower base station selected as the primary CBRS FWA tower base station; reserving an amount of spectrum for communicating with one or more auxiliary CBRS FWA tower base stations.

Computer Readable Medium Embodiment 2: The computer readable medium of computer readable medium embodiment 1, wherein the CBRS CPE base station is located at a customer premises which does not include a wired or optical broadband service connection.

Computer Readable Medium Embodiment 3: The computer readable medium of computer readable medium embodiment 1, wherein user equipment devices located at the customer premises at which the CBRS CPE base station is located are only provided broadband services through wireless communications, said wireless communications including CBRS network wireless communications.

Computer Readable Medium Embodiment 4: The computer readable medium of computer readable medium embodiment 1, wherein the CBRS CPE base station is located at a customer premises which has no landline connection.

Computer Readable Medium Embodiment 5: The computer readable medium of computer readable medium embodiment 1, wherein the CBRS CPE base station is located at a customer premises which has no landline connection over which broadband services can be provided.

Computer Readable Medium Embodiment 6: The computer readable medium of computer readable medium 1, wherein one or more of the plurality of CBRS FWA tower base stations are simultaneously operated as primary CBRS CPE base stations and auxiliary CBRS CPE base stations with regard to different additional CBRS CPE base stations located within their coverage area.

Computer Readable Medium Embodiment 7: The computer readable medium of computer readable medium embodiment 1, wherein the plurality of CBRS FWA tower base stations have overlapping coverage areas.

Computer Readable Medium Embodiment 8: The computer readable medium of computer readable medium embodiment 1, wherein said selection, based on the strength of each of the received reference signals of the primary CBRS FWA tower base station from the plurality of CBRS FWA tower stations includes: (i) determining, by the CBRS CPE base station, a Reference Signal Received Power (RSRP) level value for each reference signal received from the plurality of CBRS FWA tower base stations; and (ii) selecting, by the CBRS CPE base station, the CBRS FWA base station having the strongest RSRP level value as the primary CBRS FWA tower base station.

Computer Readable Medium Embodiment 9: The computer readable medium of computer readable medium embodiment 8, wherein one or more of the CBRS FWA base stations which were not selected as the primary CBRS FWA tower base station are designated by the CBRS CPE base station as auxiliary CBRS FWA tower base stations.

Computer Readable Medium Embodiment 10: The computer readable medium of computer readable medium embodiment 1, wherein the processor further controls the CBRS CPE base station to provide broadband services to one or more user equipment devices located at a customer premises.

The techniques of various embodiments may be implemented using software, hardware and/or a combination of software and hardware. Various embodiments are directed to apparatus, e.g., CBSDs, CBRS tower base stations, CBRS CPE base stations, SAS devices, user devices, subscriber devices, servers, nodes and/or elements. Various embodiments are also directed to methods, e.g., method of controlling and/or operating CBSDs, CBRS tower base stations, CBRS CPE base stations, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, CBSDs, CBRS tower base stations, CBRS CPE base stations, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., CBSDs, CBRS tower base stations, CBRS CPE base stations, SAS devices, user devices, subscriber devices, servers, nodes and/or elements are configured to perform the steps of the methods described as being performed by the CBSDs, CBRS tower base stations, CBRS CPE base stations, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, CBRS tower base station, CBRS CPE base station, SAS device, user device, subscriber device, server, node and/or elements, with a processor which includes a component corresponding to each of the steps of the various described methods performed by the device in which the processor is included. In some but not all embodiments a device, e.g., CBSD, CBRS tower base station, CBRS CPE base station, SAS device, user device, subscriber device, server, node and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, CBRS tower base station, CBRS CPE base station, SAS device, user device, subscriber device, server, node and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, CBRS tower base station, CBRS CPE base station, SAS device, user device, subscriber device, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a wireless Customer Premise Equipment (CPE) base station in a wireless network, the method comprising:
 receiving, by the wireless CPE base station, over the air from each of a plurality of Fixed Wireless Access (FWA) tower base stations a reference signal;
 selecting, based on the strength of each of the received reference signals, a primary FWA tower base station from the plurality of FWA tower base stations;
 establishing, by the wireless CPE base station, a wireless communications link connection with the FWA tower base station selected as the primary FWA tower base station, said wireless CPE base station providing broadband services to one or more user equipment devices located at a customer premises;
 reserving, by the CPE base station, an amount of spectrum for communicating with one or more auxiliary FWA tower base stations; and
 prior to reserving, by the wireless CPE base station, spectrum for communicating with one or more auxiliary FWA tower base stations, determining, by the wireless CPE base station, whether an amount of spectrum allocated by the primary FWA tower base station to the wireless CPE base station for device to device communications between the wireless CPE base station and the primary FWA tower base station is sufficient for providing the broadband services to the one or more user equipment devices located at the customer premises; and
 when said amount of spectrum allocated by the primary FWA tower base station to the CPE base station for device to device communications between the wireless CPE base station and the primary FWA tower base station is not sufficient for providing the broadband services to the one or more user equipment devices located at the customer premises determining an amount of additional spectrum required for providing the broadband services to the one or more user equipment devices located at the customer premises.

2. The method of claim 1, wherein selecting, based on the strength of each of the received reference signals, a primary FWA tower base station from the plurality of FWA tower stations includes:
 (i) determining, by the wireless CPE base station, a Reference Signal Received Power (RSRP) level value for each reference signal received from the plurality of FWA tower base stations; and
 (ii) selecting, by the wireless CPE base station, the FWA tower base station having the strongest RSRP level value as the primary FWA tower base station.

3. The method of claim 2, wherein one or more of the plurality of FWA tower base stations which were not selected as the primary FWA tower base station are designated by the wireless CPE base station as auxiliary FWA tower base stations.

4. The method of claim 1, wherein at least a first portion of the wireless CPE base station is located within a building at the customer premises, said wireless CPE base station including a second portion, said second portion including an antenna or antenna array mounted at an elevated position at the customers premises, said antenna or antenna array being used to wirelessly communicate with said primary FWA tower base station and said one or more auxiliary FWA tower base stations.

5. The method of claim 1, further comprising:
 establishing, by the wireless CPE base station, temporary wireless communications link connections with the one or more auxiliary FWA tower base stations; and
 utilizing said reserved spectrum for providing said broadband services to the one or more user equipment devices located at the customer premises.

6. The method of claim 1, wherein the wireless CPE base station is located at the customer premises, the customer premises having no landline connection over which broadband services can be provided.

7. The method of claim 1, wherein one or more of the plurality of FWA tower base stations are simultaneously operated as primary base stations and auxiliary base stations with regard to different additional wireless CPE base stations located within their coverage area.

8. The method of claim 1, wherein said determining, by the wireless CPE base station, whether an amount of spectrum allocated by the primary FWA tower base station to the wireless CPE base station for device to device communications between the wireless CPE base station and the primary FWA tower base station is sufficient for providing the broadband services to the one or more user equipment devices located at the customer premises includes: measuring, by the wireless CPE base station, a load that is caused by serving the user equipment devices located at the customers premises.

9. The method of claim 1, wherein the amount of spectrum reserved, by the wireless CPE base station, for communicating with one or more auxiliary FWA tower base stations is an amount which equals or exceeds the amount of additional spectrum required for providing the broadband services to the one or more user equipment devices located at the customer premises.

10. A method of operating a wireless Customer Premise Equipment (CPE) base station in a wireless network, the method comprising:
 receiving, by the wireless CPE base station, over the air from each of a plurality of Fixed Wireless Access (FWA) tower base stations a reference signal;

selecting, based on the strength of each of the received reference signals, a primary FWA tower base station from the plurality of FWA tower base stations;

establishing, by the wireless CPE base station, a wireless communications link connection with the FWA tower base station selected as the primary FWA tower base station;

reserving, by the CPE base station, an amount of spectrum for communicating with one or more auxiliary FWA tower base stations; and wherein said reserving, by the wireless CPE base station, an amount of spectrum for communicating with one or more auxiliary FWA tower base stations includes:

requesting what spectrum is available from one or more of the one or more auxiliary FWA tower base stations.

11. The method of claim 10, further comprising:

determining which of the one or more auxiliary FWA tower base stations to reserve available spectrum from based on: (i) the amount of spectrum to be reserved, (ii) an amount of spectrum reported as being available at the auxiliary FWA tower base station, and (iii) the strength of the reference signal received from the auxiliary FWA tower base station.

12. A wireless Customer Premise Equipment (CPE) base station comprising:

memory;

a first wireless input/output interface that communicates with a plurality of Fixed Wireless Access (FWA) tower base stations;

a second wireless input/output interface that communicates with user equipment devices; and a processor that controls the wireless CPE base station to:
receive, by the first wireless input/output interface, over the air from each of a plurality of Fixed Wireless Access (FWA) tower base stations a reference signal;
select, based on the strength of each of the received reference signals, a primary FWA tower base station from the plurality of FWA tower base stations;
establish, by the wireless CPE base station, a wireless communications link connection with the FWA tower base station selected as the primary FWA tower base station;
reserve, by the wireless CPE base station, an amount of spectrum for communicating with one or more auxiliary FWA tower base stations;
provide broadband services to one or more user equipment devices located at a customer premises; and
determine, by the wireless CPE base station, whether an amount of spectrum allocated by the primary FWA tower base station to the wireless CPE base station for device to device communications between the wireless CPE base station and the primary FWA tower base station is sufficient for providing the broadband services to the one or more user equipment devices located at the customer premises prior to reserving, by the wireless CPE base station, spectrum for communicating with one or more auxiliary FWA tower base stations; and
when said amount of spectrum allocated by the primary FWA tower base station to the wireless CPE base station for device to device communications between the wireless CPE base station and the primary FWA tower base station is not sufficient for providing the broadband services to the one or more user equipment devices located at the customer premises determining an amount of additional spectrum required for providing the broadband services to the one or more user equipment devices located at the customer premises.

13. The wireless CPE base station of claim 12, wherein said selection, based on the strength of each of the received reference signals, of the primary FWA tower base station from the plurality of FWA tower stations includes:
(i) determining, by the wireless CPE base station, a Reference Signal Received Power (RSRP) level value for each reference signal received from the plurality of FWA tower base stations; and
(ii) selecting, by the wireless CPE base station, the FWA tower base station having the strongest RSRP level value as the primary FWA tower base station.

14. The wireless CPE base station of claim 13, wherein one or more of the plurality of FWA tower base stations which were not selected as the primary FWA tower base station are designated by the wireless CPE base station as auxiliary FWA tower base stations.

15. The wireless CPE base station of claim 12,
wherein said wireless CPE base station includes a first portion and a second portion, said first portion including said processor and said memory, said first portion of the wireless CPE base station being located within a building at the customer premises, said second portion of the wireless CPE base station including an antenna or antenna array mounted at an elevated position at the customer premises, said antenna or antenna array being used to wirelessly communicate with said primary FWA tower base station and said one or more auxiliary FWA tower base stations, said second portion being coupled to said first portion.

16. The wireless CPE base station of claim 12, wherein said processor further controls the wireless CPE base station to:

establish temporary wireless communications link connections with the one or more auxiliary FWA tower base stations; and utilize said reserved spectrum for providing said broadband services to the one or more user equipment devices located at the customer premises.

17. A wireless Customer Premise Equipment (CPE) base station comprising:

memory;

a first wireless input/output interface that communicates with a plurality of Fixed Wireless Access (FWA) tower base stations;

a second wireless input/output interface that communicates with user equipment devices; and a processor that controls the wireless CPE base station to:
receive, by the first wireless input/output interface, over the air from each of the plurality of Fixed Wireless Access (FWA) tower base stations a reference signal;
select, based on the strength of each of the received reference signals, a primary FWA tower base station from the plurality of FWA tower base stations;
establish, by the wireless CPE base station, a wireless communications link connection with the FWA tower base station selected as the primary FWA tower base station;
reserve, by the wireless CPE base station, an amount of spectrum for communicating with one or more auxiliary FWA tower base stations; and
wherein said to reserve an amount of spectrum for communicating with one or more auxiliary FWA tower base stations includes:

requesting what spectrum is available from one or more of the one or more auxiliary FWA tower base stations.

18. The wireless CPE base station of claim 17 wherein said processor further controls the wireless CPE base station to:
determine which of the one or more auxiliary FWA tower base stations to reserve available spectrum from based on: (i) the amount of spectrum to be reserved, (ii) an amount of spectrum reported as being available at the auxiliary FWA tower base station, and (iii) the strength of the reference signal received from the auxiliary FWA tower base station.

19. A non-transitory computer readable medium including a first set of computer executable instructions which when executed by a processor of a wireless Customer Premise Equipment (CPE) base station cause the wireless CPE base station to perform the steps of:
receiving over the air from each of a plurality of Fixed Wireless Access (FWA) tower base stations a reference signal;
selecting, based on the strength of each of the received reference signals, a primary FWA tower base station from the plurality of FWA tower base stations;
establishing a wireless communications link connection with the FWA tower base station selected as the primary FWA tower base station;
reserving an amount of spectrum for communicating with one or more auxiliary FWA tower base stations; and
wherein said reserving, by the wireless CPE base station, an amount of spectrum for communicating with one or more auxiliary FWA tower base stations includes requesting what spectrum is available from one or more of the one or more auxiliary FWA tower base stations.

20. The non-transitory computer readable medium of claim 19, wherein said step of selecting, based on the strength of each of the received reference signals, the primary FWA tower base station from the plurality of FWA tower stations includes:
(i) determining, by the CPE base station, a Reference Signal Received Power (RSRP) level value for each reference signal received from the plurality of FWA tower base stations; and
(ii) selecting, by the CPE base station, the FWA tower base station having the strongest RSRP level value as the primary FWA tower base station.

* * * * *